(12) United States Patent
Ichikawa et al.

(10) Patent No.: US 9,212,333 B2
(45) Date of Patent: Dec. 15, 2015

(54) DISPERSANT, DISPERSION, METHOD FOR ADJUSTING VISCOSITY OF DISPERSANT, MOBILE DEVICE, SURFACE TREATMENT AGENT, ELECTROLYTIC SOLUTION, SEPARATOR, AND RECHARGEABLE LITHIUM ION BATTERY

(75) Inventors: Satoshi Ichikawa, Gifu (JP); Kazuhiro Oda, Gifu (JP); Shigeru Yao, Fukuoka (JP)

(73) Assignee: Fukuoka University, Fukuoka (JP)

( * ) Notice: Subject to any disclaimer, the term of this patent is extended or adjusted under 35 U.S.C. 154(b) by 191 days.

(21) Appl. No.: 13/980,845

(22) PCT Filed: Nov. 8, 2011

(86) PCT No.: PCT/JP2011/075743
§ 371 (c)(1),
(2), (4) Date: Oct. 21, 2013

(87) PCT Pub. No.: WO2012/098750
PCT Pub. Date: Jul. 26, 2012

(65) Prior Publication Data
US 2014/0045053 A1   Feb. 13, 2014

(30) Foreign Application Priority Data

Jan. 21, 2011  (WO) .................. PCT/JP2011/051129
Jul. 15, 2011  (WO) .................. PCT/JP2011/066250

(51) Int. Cl.
*C10M 155/02*   (2006.01)
*C10M 145/04*   (2006.01)
(Continued)

(52) U.S. Cl.
CPC .............. *C10M 155/02* (2013.01); *B01F 17/00* (2013.01); *B01F 17/0028* (2013.01); *C10M 145/14* (2013.01); *C10M 149/04* (2013.01)

(58) Field of Classification Search
CPC . C10M 155/02; C10M 145/04; C10M 149/14
USPC .................. 524/514, 520, 523, 528; 429/188; 508/469, 470, 205, 591, 590
See application file for complete search history.

(56) References Cited

U.S. PATENT DOCUMENTS

2006/0211586 A1* 9/2006 Huang .................. C10M 43/00
                                                       508/591
2011/0274982 A1  11/2011 Kaneko et al.

FOREIGN PATENT DOCUMENTS

JP    H11344065 A    12/1999
JP    2001283811 A   10/2001
(Continued)

OTHER PUBLICATIONS

Notification of Transmittal of Translation of the International Preliminary Report on Patentability for International Application No. PCT/JP2011/075743, dated Aug. 1, 2013.
(Continued)

*Primary Examiner* — Vu A Nguyen
(74) *Attorney, Agent, or Firm* — Kinney & Lange, P.A.

(57) ABSTRACT

A dispersant of the present invention is used after being added to a dispersant obtained by dispersing fine particles of a crystalline polymer as a dispersed particle and is characterized by containing a copolymer of a first monomer and a second monomer, the first monomer being a monomer that can be crystallized as a polymer having the molecular structure identical to that of the dispersed particle.

14 Claims, 9 Drawing Sheets

(51) Int. Cl.
*C10M 149/14* (2006.01)
*B01F 17/00* (2006.01)
*C10M 145/14* (2006.01)
*C10M 149/04* (2006.01)

(56) References Cited

FOREIGN PATENT DOCUMENTS

| JP | 2004026887 A | 1/2004 |
|---|---|---|
| JP | 20040026887 A | 1/2004 |
| JP | 2005291338 A | 10/2005 |
| JP | 2009056444 A | 3/2009 |
| JP | 2010090338 A | 4/2010 |
| JP | 2010099593 A | 5/2010 |
| JP | 2010170878 A | 8/2010 |
| JP | 20100099593 A | 8/2010 |

OTHER PUBLICATIONS

Notification of Transmittal of Translation of the International Preliminary Report on Patentability for International Application No. PCT/JP2011/066250, dated Aug. 1, 2013.
Notification of Transmittal of Translation of the International Preliminary Report on Patentability for International Application No. PCT/JP2011/051129, dated Aug. 1, 2013.
International Search Report of the Japanese Patent Office in application No. PCT/JP2011/075743 dated Feb. 14, 2012.
Yao et al., "A Novel Dispersant for High Content Polyethylene Particle Dispersion," 2011, vol. 39, No. 4, 181-182, Journal of the Society of Rheology, Japan.

* cited by examiner

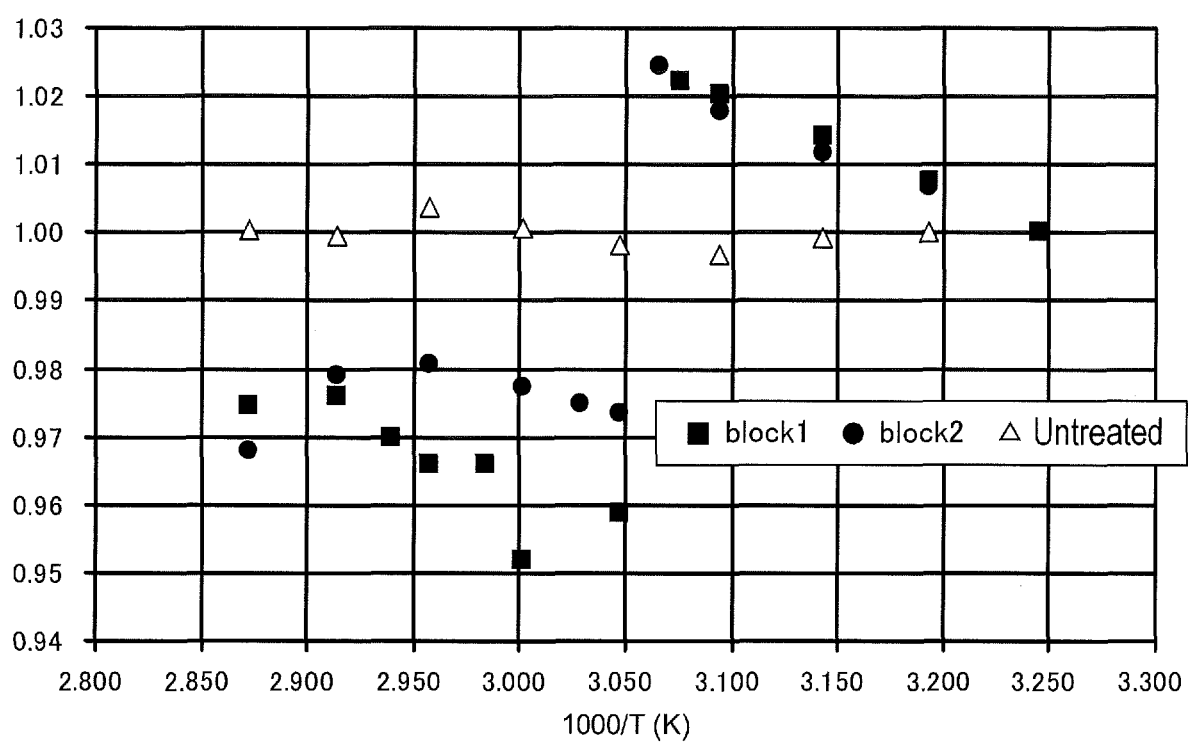

DISPERSANT, DISPERSION, METHOD FOR ADJUSTING VISCOSITY OF DISPERSANT, MOBILE DEVICE, SURFACE TREATMENT AGENT, ELECTROLYTIC SOLUTION, SEPARATOR, AND RECHARGEABLE LITHIUM ION BATTERY

CROSS-REFERENCE TO RELATED APPLICATIONS

This international application claims priority to International Application No. PCT/JP2011/51129 filed on Jan. 21, 2011 with the Japan Patent Office as the receiving office and International Application No. PCT/JP2011/66250 filed on Jul. 15, 2011 with the Japan Patent Office as the receiving office, and International Application No. PCT/JP2011/51129 and International Application No. PCT/JP2011/66250 are entirely incorporated herein by reference.

TECHNICAL FIELD

The present invention relates to a dispersant to be used by addition to a dispersion material with fine particles comprising a crystalline polymer dispersed as dispersed particles, a dispersion material with the dispersant added, a method for adjusting a viscosity of a dispersion material, a mobile device, and a surface treatment agent to be used for a separator of a rechargeable lithium ion battery.

BACKGROUND ART

A dispersion material obtained by dispersing fine particles of a crystalline polymer into a dispersion medium is utilized for paints, inks, cosmetics, lubricants, industrial oil, and the like, but a viscosity of the dispersion material may be sharply increased if an amount of the fine particles of the crystalline polymer would be increased, resulting in difficulty in using the dispersion material in some cases. Recently, attempts for producing a fuel by finely dispersing polyethylene or the like for the purpose of reusing waste plastics as energy have been made, however, an increase in the amount of fine particles of polyethylene or the like leads to an increase in viscosity of the dispersion material, causing the problem that the dispersion material may become hard to be handled and that, as a result, it is difficult to improve energy efficiency due to the difficulty in increasing the concentration of the dispersion material.

As a dispersant for a dispersion material of fine particles of polylactic acid has been proposed (see Patent Document 1). A dispersant usable for a dispersion material containing PTFE fine particles has also been proposed (see Patent Document 2).

For industrial oil to be used for a mobile device such as a damper and a clutch, it is necessary to adjust its viscosity, and the control of the viscosity of certain industrial oil has been realized by using an electroviscous fluid or a magnetoviscous fluid (see Patent Document 3, for example).

In recent years, there is an increasing demand for a rechargeable battery that is of a small size and light weight and has a high energy density as a driving power source of an electronic appliance such as a mobile phone, a personal computer, and a video camera. Among others, due to its high energy density at a high voltage, there has been widely used a rechargeable lithium ion battery that comprises a lithium-containing composite oxide used as a cathode active material; a carbonaceous material, a silicon compound, a tin compound, or the like capable of occluding or releasing lithium ions used as an anode material; a microporous film made from polyethylene, polypropylene, or the like as a separator disposed between the cathode and the anode electrode; and an aprotic organic solvent of a lithium salt such as $LiBF_4$ and $LiPF_6$ used as an electrolytic solution (see Patent Document 4, for example).

PRIOR ART DOCUMENTS

Patent Documents

Patent Document 1: Japanese Patent Application Publication No. 2009-056444.
Patent Document 2: Japanese Patent Application Publication No. 2010-90338.
Patent Document 3: Japanese Patent No. 4017746.
Patent Document 4: Japanese Patent Application Publication No. 2001-283811.

SUMMARY OF THE INVENTION

Problems to be Solved by the Invention

The dispersant disclosed in Patent Document 1 is usable only for stabilization of dispersing a dispersion material of polylactic acid having fine particles of 3 µm or less and is not intended to be used for reduction and adjustment of the viscosity of the dispersion material of polylactic acid particles and other fine particles. The method disclosed therein is not a method that can be used with ease because the adjustment of the dispersion material per se requires process steps of substitution for solvents and the like.

The dispersant of Patent Document 2 is not applicable to the usage for reducing a viscosity of a highly viscous dispersion material and is low in universal use.

As described above, there has not been any dispersant that is capable of reducing and adjusting the viscosity of a dispersion material in which fine particles of a crystalline polymer are dispersed as dispersed particles.

A device using electroviscous fluid or magnetoviscous fluid needs to be provided with a mechanism for executing a complicated control and with a configuration that prevents electrification as described in Patent Document 3.

Since the separator produced from a material having weak polarity such as polyethylene and polypropylene has poor wettability with a polar solution such as ethylene carbonate, propylene carbonate, and dimethyl carbonate, it is difficult to permeate the solution into an interior of the porous separator, causing problems that improvements in performance may be hampered due to an elevated electric resistance between the cathode and the anode and that a special production step such as suctioning for permeation of the electrolytic solution into the separator is required.

In the rechargeable lithium ion battery, a porous film of a crystalline polymer having a so-called shutdown mechanism is used as the separator in order to prevent a sharp increase in the battery temperature due to overcharge or overdischarge of the battery and ignition accompanied therewith by melting or collapsing the porous structure of the porous film. However, if the porous structure of the separator would be molten or collapsed, the battery cannot work any longer as a battery. It is also pointed out that a risk of thermal runaway or ignition may be caused to occur by short-circuiting between the cathode and the anode due to shrinkage of a sectional area by recrystallization of the once molten polymer of the separator by a decrease in the battery temperature upon the blockade of an electric circuit by shutdown. Therefore, the prior art battery requires complicated processing such as processing for separately providing an electric circuit for prevention of overcharge or over-discharge.

An object of the present invention is to provide a novel dispersant capable of satisfactorily reducing a viscosity of a dispersion material, a dispersion material to which the dispersant is added, and a method for adjusting a viscosity of the dispersion material. Another object of the present invention is to provide a mobile device using the dispersion material.

Yet another object of the present invention is to provide a surface treatment agent capable of improving wettability of a separator of a rechargeable lithium ion battery, a separator which is surface-treated with the surface treatment agent, an electrolytic solution to which the surface treatment agent is added, and a rechargeable lithium ion battery having the separator or the electrolytic solution.

Still another object of the present invention is to provide a surface treatment agent for a separator which is capable of simplifying a structure of a rechargeable lithium ion battery and suppressing a hazardous increase in temperature, a separator which is surface-treated with the surface treatment agent, an electrolytic solution to which the surface treatment agent is added, and a rechargeable lithium ion battery having the separator or the electrolytic solution.

Means for Solving the Problems

A dispersant according to a first aspect of the present invention is a dispersant to be used by addition to a dispersion material in which fine particles of a crystalline polymer are dispersed as dispersed particles, characterized in that the dispersant comprises a copolymer of a first monomer and a second monomer, and the first monomer is a monomer that can be crystallized as a polymer having a molecular structure identical to that of the dispersed particle.

The dispersant having the above-described constitution is capable of considerably reducing a viscosity of the dispersion material in which the fine particles of the crystalline polymer having an molecular structure identical to that of the polymer obtained by the crystallization of the first monomer are dispersed as the dispersed particle.

For a dispersant in a second aspect of the present invention, the first monomer may be at least one kind selected from the group consisting of (A) to (D) described below:

(A) ethylene;
(B) any one of (meth)acrylate, (meth)acrylamide, vinyl ether, vinyl ester, siloxane, α-olefin, and substituted styrene, each having a straight-chained alkyl group having at least 8 carbon atoms at a side chain;
(C) any one of (meth)acrylate, (meth)acrylamide, vinyl ether, vinyl ester, siloxane, α-olefin, and substituted styrene, each having a straight-chained alkyl group having at least 8 carbon atoms at a side chain and being at least partially substituted with fluorine; and
(D) polypropylene.

In a third aspect of the present invention, the second monomer may be at least one kind selected from the group consisting of (E) to (N) described below:

(E) any one of (meth)acrylate, vinyl ether, vinyl ester, maleic acid ester, itaconic acid ester, acrylamide, and substituted styrene, each having a straight-chained alkyl group having 7 carbon atoms or less;
(F) any one of (meth)acrylate, vinyl ether, vinyl ester, maleic acid ester, itaconic acid ester, acrylamide, and substituted styrene, each having a branched alkyl group;
(G) any one of (meth)acrylate, vinyl ether, vinyl ester, maleic acid ester, itaconic acid ester, and acrylamide, each having an aryl group;
(H) any one of (meth)acrylate, vinyl ether, vinyl ester, maleic acid ester, itaconic acid ester, acrylamide, and substituted styrene, each having an oxyethylene structure or an oxypropylene structure;
(I) styrene;
(J) acrylic acid;
(K) methacrylic acid;
(L) vinyl acetate;
(M) (meth)acrylate having dimethyl siloxane at a side chain; and
(N) (meth)acrylate having fluorinated alkyl at a side chain.

The dispersant according to a fourth aspect of the present invention is characterized in that the copolymer of the first monomer and the second monomer of the dispersant of any one of the first to third aspects is a block copolymer. As a matter of course, as a mode different from the dispersant of the fourth aspect, the copolymer of the first monomer with the second monomer may be a random copolymer or a triblock copolymer.

A dispersant in a fifth aspect of the present invention of the dispersant according to any one of the first to fourth aspects is characterized in that the dispersant is used for a dispersion material obtainable by using fine particles comprising a polyethylene-based or nylon-based crystalline polymer as dispersed particles.

In the above case, the first monomer of a dispersant according to a sixth aspect of the present invention may be a (meth)acrylate having a straight-chained alkyl group having at least 8 carbon atoms at a side chain or ethylene, and the second monomer may be a (meth)acrylate, each having a straight-chained alkyl group having 7 carbon atoms or less, a branched alkyl group, an aryl group, or an oxyethylene structure, or vinyl acetate.

Further, the first monomer of a dispersant according to a seventh aspect of the present invention may be a (meth)acrylate having a straight-chained alkyl group having at least 12 carbon atoms at a side chain.

Moreover, a dispersant in an eighth aspect of the present invention according to the dispersant of any one of the first to fourth aspects is characterized in that the dispersant is used for the dispersion material using fine particles comprising a polyfluoroethylene-based crystalline polymer as the dispersed particles.

In the above-described case, for a dispersant according to a ninth aspect of the present invention, the first monomer may be a (meth)acrylate having a straight-chained alkyl group with at least 8 carbon atoms at a side chain and being at least partially substituted with fluorine, or ethylene, and the second monomer may be a (meth)acrylate, each having a straight-chained alkyl group having 7 carbon atoms or less, a branched alkyl group, an aryl group, or an oxyethylene structure.

A dispersant in a tenth aspect of the present invention according to the dispersant in any one of the first to ninth aspects is characterized in that a viscosity of the dispersion material with the dispersant added is reversibly increased as a temperature of the dispersion material is increased.

A dispersion material according to an eleventh aspect is a dispersion material comprising fine particles of a crystalline polymer, the dispersant according to any one of the first to fourth aspects, and a dispersion medium.

A dispersion material in a twelfth aspect of the present invention is a dispersion material comprising the fine particles of a polyethylene-based or nylon-based crystalline polymer, the dispersant according to any one of the fifth to seventh aspects, and a dispersion medium.

A dispersion material of a thirteenth aspect of the present invention is a dispersion material comprising fine particles of a polyfluoroethylene-based crystalline polymer, the dispersant according to the eighth or ninth aspect, and a dispersion medium.

The dispersion material in each of the eleventh to thirteenth aspects is capable of considerably reducing a viscosity compared with a dispersion material to which no dispersant is added.

A method for adjusting a viscosity of the dispersion material in a fourteenth aspect of the present invention is characterized in that the viscosity of the dispersion material is increased by elevating a temperature of the dispersion material according to any one of the eleventh to thirteenth aspects of the present invention or it is reduced by lowering a temperature of the dispersion material of any one of the eleventh to thirteenth aspects of the present invention. For the dispersion material to which the dispersant of the present invention is added, the viscosity of the dispersion material is increased when the temperature of the dispersion material is elevated, and the viscosity thereof is reduced when the temperature thereof is lowered. The dispersion material may change its viscosity sharply within a predetermined temperature range which may be previously determined depending on the composition of the dispersant. Therefore, it is possible to readily adjust the viscosity of the dispersion material by changing the temperature of the dispersion material.

The dispersant in a fifteenth aspect of the present invention is characterized in that the dispersant comprises a copolymer of the first monomer that is at least one kind selected from the group consisting of (A) to (D) described above and the second monomer that is at least one kind selected from the group consisting of (E) to (N) described above.

A mobile device according to a sixteenth aspect of the present invention is characterized in that the mobile device comprises a housing chargeable with a fluid, a mobile member held in the housing in such a manner that at least its portion is disposed inside the housing and the other portion is disposed outside it so as to allow a predetermined operation, and the dispersion material according to any one of the eleventh to thirteenth aspects of the present invention to be charged in the housing.

The mobile device can utilize the dispersion material according to any one of the eleventh to thirteenth aspects. This mobile device does not require any complicated control mechanism as for the mobile device using electroviscous or magnetoviscous fluid, and it may reduce a risk of electrification that may be caused to occur by generation of a high voltage because no generation of such a high voltage is required.

The mobile device can also attain operation properties by utilizing the properties of the above-described dispersion material. For example, since the dispersion material has the property that the viscosity is increased as the temperature is elevated, it is possible to change the operation properties of the mobile device by changing a viscosity of the dispersion material by adjustment of the temperature of the dispersion material to be used in the mobile device.

As the predetermined operation of the mobile member, there may be mentioned, for example, operation in a direction of straight line such as a reciprocating operation, and a rotational operation about a predetermined axis. However, the operation may be those other than the above-described ones, and operation may be a complicated operation using a linking mechanism. The operation is not limited insofar as the property of the operation changes depending on the viscosity of the dispersion material charged in the housing.

A mobile device of a seventeenth aspect of the present invention according to the mobile device of the sixteenth aspect is characterized by a tubular-shaped housing, and the mobile member comprises a partition part fitted into the housing so as to be slidable in an axial direction of the housing and partitioning the housing into a first fluid chamber and a second fluid chamber, a projection part connected to the partition part and projecting outside the housing through a wall of the housing, and an orifice communicating the first fluid chamber with the second fluid chamber.

The mobile device may be used as a so-called damper.

A mobile device of an eighteenth aspect of the present invention according to the mobile device of the sixteenth aspect is characterized in that the mobile member comprises a shaft communicating the outside of the housing with the inside thereof, and a rotor connected to the shaft and disposed rotatably inside the housing by using the shaft as a rotation axis.

The mobile device may be used as a so-called rotary damper.

A mobile device of a nineteenth aspect of the present invention according to the mobile device of the sixteenth aspect is characterized in that the mobile member comprises a shaft communicating the outside of the housing with the inside thereof, a first rotary element connected to the shaft and disposed rotatably inside the housing by using the shaft as a rotation axis, and a second rotary element disposed so as to be coaxially rotatable with the shaft along with the rotation of the first rotary element by a viscous friction of the dispersion material to be charged in the housing. In this case, the second rotary element may be used as the housing according to a mobile device of a twentieth aspect.

The mobile device may be used as a so-called clutch.

A mobile device of a twenty-first aspect of the present invention according to the mobile device of any one of the sixteenth to twentieth aspect is characterized by a heater for heating the dispersion material. In this case, the heater may be disposed on an outer surface of the housing according to a mobile device of a twenty-second aspect.

The mobile device as described above can adjust the temperature of the dispersion material by the heater, thereby enabling to change the operation properties of the mobile device.

A mobile device of a twenty-third aspect of the present invention according to the mobile device of any one of the eighteenth aspect as well as the twenty-first and twenty-second aspects each quoting the invention of the eighteenth aspect is characterized by a driving unit applying a torque to the shaft so as to rotate the shaft at a predetermined rotational speed, a measurement unit for measuring the torque applied by the driving unit to the shaft, and an output unit for performing a predetermined output as the torque measured by the measurement unit reaches a predetermined value.

As the viscosity of the dispersion material charged in the housing changes, the torque required for rotating the shaft changes at the predetermined speed. The above-described mobile device allows an appropriate operation when the viscosity of the dispersion material charged in the housing is changed by the change of the temperature of the dispersion material thereby performing the predetermined output as the torque applied to the shaft is changed by the change of the viscosity. When the viscosity of the dispersion material is increased by the rise of the temperature of the dispersion material, a safe operation can be made by controlling the temperature of the dispersion material within a constant temperature range, for example, by outputting a control signal to a cooler in order that the cooler is operated to reduce the temperature of the dispersion material or outputting a control signal to the driving unit in order that the rotational speed of the shaft is reduced.

A mobile device of a twenty-fourth aspect of the present invention according to the mobile device of any one of the eighteenth aspect as well as the twenty-first and twenty-second aspects quoting the invention of the eighteenth aspect is characterized by a driving applying a predetermined torque to the shaft, a measurement unit measuring the rotational speed of the shaft driven by the driving unit, and an output unit performing a predetermined output when the rotational speed measured by the measurement unit reaches a predetermined value.

When the viscosity of the dispersion material charged in the housing changes, the shaft to which the predetermined torque is applied changes its rotational speed. The above-described mobile device can be operated in an appropriate fashion by performing predetermined output when the viscosity of the dispersion material charged in the housing is changed by the change in the temperature of the dispersion material and as a result the rotational speed of the shaft is changed. When the viscosity of the dispersion material increases as the temperature of the dispersion material arises, a safe operation can be conducted by controlling the temperature of the dispersion material in a constant temperature range, for example, by outputting a control signal to the cooler and operating the cooler to lower the temperature of the dispersion material or by outputting a control signal to the driving unit to reduce the torque to be applied to the shaft.

A mobile device of a twenty-fifth aspect of the present invention according to the mobile device of any one of the nineteenth aspect, the twentieth aspect, the twenty-first aspect quoting the invention of the nineteenth or twentieth aspect, and the twenty-second aspect quoting the invention of the nineteenth or twentieth aspect is characterized by the driving unit applying a torque to the shaft so as to rotate the shaft at a predetermined rotational speed, the measurement unit measuring the rotational speed of the second rotary element or the torque, and the output unit performing a predetermined output when the rotational speed or the torque measured by the measurement unit reaches a predetermined value.

A mobile device of a twenty-sixth aspect of the present invention according to the mobile device of any one of the nineteenth aspect, the twentieth aspect, the twenty-first aspect quoting the invention of the nineteenth or twentieth aspect, and the twenty-second aspect quoting the invention of the nineteenth or twentieth aspect is characterized by the driving unit applying a predetermined torque to the shaft, the measurement unit measuring the rotational speed of the second rotary element or the torque, and the output unit performing a predetermined output when the rotational speed or the torque measured by the measurement unit reaches a predetermined value.

When the viscosity of the dispersion material charged in the housing changes, the rotational speed or the torque of the second rotary element changes, which rotates along with the rotation of the shaft, i.e. with the rotation of the first rotary element.

The above-described mobile devices of the twenty-fifth and twenty-sixth aspects of the present invention can be operated in an appropriate fashion by changing the viscosity of the dispersion material charged in the housing by the change in the temperature of the dispersion material and consequently performing predetermined output when the rotational speed or the torque of the second rotation element is changed. When the viscosity of the dispersion material increases as the temperature of the dispersion material arises, a safe operation can be conducted by controlling the temperature of the dispersion material within a constant temperature range, for example, by outputting a control signal to the cooler and operating the cooler to lower the temperature of the dispersion material or to the driving unit to reduce the torque to be applied to the shaft.

A surface treatment agent of a twenty-seventh aspect of the present invention is used for a separator of a rechargeable lithium ion battery comprising a crystalline polymer as a main component. The surface treatment agent comprises a copolymer of a first monomer and a second monomer and is characterized in that the first monomer is a monomer that can be crystallized as a polymer having a molecular structure identical to that of the crystalline polymer forming the separator.

The separator treated with the surface treatment agent having the above-described constitution attains satisfactory wettability with an electrolytic solution of the separator. Therefore, the electrolytic solution can readily permeate into an interior of the separator, enabling to attain the effect that no special production step for suppression of deterioration in properties of the separator and for suction is required.

As the first monomer for a surface treatment agent of a twenty-eighth aspect of the present invention, there may be mentioned at least one kind selected from the group consisting of (A) to (D) described below:

(A) ethylene;

(B) at least one of (meth)acrylate, (meth)acrylamide, vinyl ether, vinyl ester, siloxane, α-olefin, and substituted styrene, each having a straight-chained alkyl group having at least 8 carbon atoms at a side chain;

(C) at least one of (meth)acrylate, (meth)acrylamide, vinyl ether, vinyl ester, siloxane, α-olefin, and substituted styrene, each having a straight-chained alkyl group having at least 8 carbon atoms at a side chain and being at least partially substituted with fluorine; and (D) polypropylene.

As the second monomer of a surface treatment agent according to a twenty-ninth aspect of the present invention, there may be mentioned at least one kind selected from the group consisting of (E) to (N) described below:

(E) at least one of (meth)acrylate, vinyl ether, vinyl ester, maleic acid ester, itaconic acid ester, acrylamide, and substituted styrene, each having a straight-chained alkyl group having 7 carbon atoms or less;

(F) at least one of (meth)acrylate, vinyl ether, vinyl ester, maleic acid ester, itaconic acid ester, acrylamide, and substituted styrene, each having a branched alkyl group;

(G) at least one of (meth)acrylate, vinyl ether, vinyl ester, maleic acid ester, itaconic acid ester, and acrylamide, each having an aryl group;

(H) at least one of (meth)acrylate, vinyl ether, vinyl ester, maleic acid ester, itaconic acid ester, acrylamide, and substituted styrene, each having an oxyethylene structure or an oxypropylene structure;

(I) styrene;

(J) acrylic acid;

(K) methacrylic acid;

(L) vinyl acetate;

(M) (meth)acrylate having dimethyl siloxane at a side chain; and (N) (meth)acrylate having fluorinated alkyl at a side chain.

A surface treatment agent of a thirtieth aspect of the present invention according to the surface treatment agent in any one of the twenty-seventh to twenty-ninth aspects is characterized by a copolymer of the first and second monomers. As a matter of course, the copolymer of the first monomer and the second monomer may be a random copolymer or a triblock copolymer in a mode different from the dispersant of the fourth aspect.

A surface treatment agent in a thirty-first aspect of the present invention according to the surface treatment agent of any one of the twenty-seventh to thirtieth aspects is characterized by the use of the separator of a polyethylene-based or nylon-based crystalline polymer.

In the above case, for a surface treatment agent in a thirty-second aspect of the present invention, the first monomer may include (meth)acrylate having a straight-chained alkyl group having at least 8 carbon atoms at a side chain or ethylene, and the second monomer may include vinyl acetate or any one of (meth)acrylates, each having a straight-chained alkyl group having 7 carbon atoms or less, a branched alkyl group, an aryl group, or an oxyethylene structure.

Further, for a surface treatment agent in a thirty-third aspect of the present invention, the first monomer may be (meth)acrylate having a straight-chained alkyl group having at least 12 carbon atoms at a side chain.

A surface treatment agent in a thirty-fourth aspect of the present invention according to the surface treatment agent of any one of the twenty-seventh to thirtieth aspects is characterized by the separator of a polyfluoroethylene-based crystalline polymer.

In the above-described case, for a surface treatment agent in a thirty-fifth aspect of the present invention, the first monomer may include (meth)acrylate having a straight-chained alkyl group having at least 8 carbon atoms at a side chain and being at least partially substituted with fluorine, or ethylene, and the second monomer may be any one of (meth)acrylates, each having a straight-chained alkyl group having 7 carbon atoms or less, a branched alkyl group, an aryl group, or an oxyethylene structure.

A surface treatment agent in a thirty-sixth aspect of the present invention according to the surface treatment agent in any one of the twenty-seventh to thirty-fifth aspects is characterized in that electric resistance between a positive electrode and a negative electrode of the rechargeable lithium ion battery can be sharply increased with a rise of the temperature or decreased with a lowering of the temperature, reversibly, within a predetermined temperature range.

The invention according to a thirty-seventh aspect of the present invention provides a separator for rechargeable lithium ion battery surface-treated with the surface treatment agent in any one of the twenty-seventh to thirty-sixth aspects.

The invention according to a thirty-eighth aspect of the present invention provides a separator for rechargeable lithium ion battery comprising a polyethylene-based or nylon-based crystalline polymer as a main component, the separator being surface-treated with the surface treatment agent in any one of the thirty-first to thirty-third aspects.

The invention according to a thirty-ninth aspect of the present invention provides a separator for rechargeable lithium ion battery comprising a polyfluoroethylene-based crystalline polymer as a main component, the separator being surface-treated with the surface treatment agent in the thirty-fourth or thirty-fifth aspect.

The invention according to a fortieth aspect of the present invention provides an electrolytic solution for rechargeable lithium ion battery to which the surface treatment agent in any one of the twenty-seventh to thirty-sixth aspects is added.

The invention according to a forty-first aspect of the present invention provides a rechargeable lithium ion battery characterized by the separator according to any one of the thirty-seventh to thirty-ninth aspects of the present invention.

The invention according to a forty-second aspect of the present invention provides a rechargeable lithium ion battery characterized by the electrolytic solution in the fortieth aspect of the present invention.

Effects of the Invention

The dispersant of the present invention can considerably reduce a viscosity of a dispersion material in which fine particles of a crystalline polymer are dispersed as dispersed particles. The dispersion material using the dispersant of the present invention is advantageously applicable to various usages. For example, in a process of treating a conventional dispersant of crystalline fine particle, energy can be saved by substitution of a lower output pump to be used for a fluidization process of a dispersion material with the one having a lower output since the dispersion material can be handled at a very low viscosity. The merits can also be attained that a device can be downsized as a whole because a diameter of a piping or the like can be reduced and a space can be saved.

Further, though it has difficult to apply a conventional paint or ink having a high viscosity to a spray, an inkjet and so on, the reduction in viscosity can make its application easier. A coating in a uniform thickness or in a thin film can be made easier.

For the dispersion material containing the fine particles of the crystalline polymer at a predetermined concentration, the viscosity can be made lower by adding the dispersant of the present invention thereto. By utilizing this effect, the concentration of the fine particle of the dispersion material can be made higher while maintaining the viscosity at the identical viscosity. This effect can be advantageously applied to provide a paint or ink that is not only more durable but also presents an image of deep or high quality.

Moreover, in the case of by burning the dispersion material with the fine particles of waste plastics in a solvent or converting it into a fuel, the present invention can be applied very usefully from a viewpoint of environment and energy because the concentration of the fine particles of the waste plastics can be made higher while maintaining the viscosity at a low level by adding the dispersant of the present invention, thereby improving a disposal volume of the waste plastics and combustion efficiency to a great extent.

Furthermore, the viscosity of the dispersion material using the dispersant of the present invention can be adjusted freely by a temperature. Particularly, since the viscosity can be increased by elevating the temperature, the viscosity of a paint, ink, or coating can be controlled during a drying step. It has heretofore been desired to impart a so-called thixotropic property, i.e., lowering a viscosity in a coating step and raising the viscosity in a drying step, to the paint, ink, and coating, however, this is a very difficult problem to solve because the viscosity may be generally lowered as the temperature rises.

However, the dispersant and the dispersion material using the dispersant according to the present invention can be advantageously applied to find a solution of this problem. Also, concerning a flow rate control of a fluid (dispersion material), the flow rate of the fluid can be controlled by controlling a temperature of a flow path through which the fluid passes, and a load of the flow rate can be controlled using complicated electronic valves and valves, thereby simplifying a device or saving energy.

Further, an electroviscous fluid, a magnetoviscous fluid and so on have heretofore been proposed for controlling the viscosity of a fluid, but the control of the viscosity by using these fluids requires a complicated electronic or magnetic control. Moreover, as there is a limit of allowing the dispersing fine particles or medium to achieving its effect, it has been difficult to disseminate this conventional viscosity control to a general usage. Furthermore, as a device using an electroviscous fluid or a magnetoviscous fluid requires a mechanism for implementing a complicated control, it presents a problem that a cost of the device can become expensive, in addition of a problem that the fluids are expensive, too.

The dispersant and the dispersion material using it in accordance with the present invention are versatile in usage because fine particles of a crystalline polymer for general use can be applied thereto. The can also be applied to a part for which electricity or magnetism cannot be used. Further, the dispersion material per se can be produced at a low cost, and a device using the dispersion material can also be manufactured at a low cost because no complicated device configuration for controlling electricity or magnetism is required any and can be produced. These above-described characteristics can be advantageously applied to viscosity-changeable lubricant oil, dampers, clutches, valves, engine mounts, actuators to be used for artificial muscles, virtual reality that requires delicate expression of kinesthetic sense, precise position and speed controls, and the like.

The property called a change of a physical property by the temperature can be utilized effectively for various temperature sensors or insulation materials.

Further, it is assumed that the property of the dispersant according to the present invention is exhibited due to the fact that a crystalline portion constituting the dispersant is adsorbed on a surface of a material of crystalline particles (polymer) and a non-crystalline portion thereof covers a particle surface. By changing the second monomer optionally by utilizing this phenomenon, properties of a particle surface or a material surface can be changed.

For example, particles can be treated so as to impart a water repellency to the surfaces of the particles by synthesizing a polymer with a fluorine-substituted monomer or siliconmodified monomer as the second monomer for imparting the water repellency.

In order to provide a design or a protective layer by printing or coating, a surface of a material using a crystalline polymer has been conventionally modified by a surface treatment step such as plasma treatment step, an oxidizing treatment using strong acid or ozone, or the like. The present invention does not require such steps resulting in a reduction in cost and bringing considerable benefits in terms of environment and energy.

Further, the separator for a rechargeable lithium ion battery treated with the surface treatment agent according to the present invention can improve wettability of an electrolytic solution. The separator comprising the crystalline polymer such as porous polyethylene (PE) as a main component can be used for the lithium ion battery. Moreover, the electrolytic solution with an electrolyte dissolved in an organic solvent having a high polarity such as ethylene carbonate, propylene carbonate, and dimethyl carbonate can be used by impregnation or infusion into the voids of the porous PE. If a material having a poor polarity such as PE would be used for the separator, the electrolytic solution having a high polarity may become very likely to be leaked so that it is hardly impregnated or infused. The separator surface-treated with the surface treatment agent according to the present invention, however, the wettability of the electrolytic solution can be improved by modifying the surface properties of the separator using the first monomer having a high affinity to the separator and the second monomer having a high affinity to the electrolytic solution/

The rechargeable lithium ion battery using the separator treated with the surface treatment agent according to the present invention can suppress thermal runaway that may be otherwise caused by the elevation of the temperature due to a sharp rise of electric resistance. Further, since it is possible to detect the increase of the temperature due to a rise of electric resistance, the increase of the temperature can be detected without separately mounting a temperature sensor. As a result, the constitution of the rechargeable lithium ion battery can be simplified. Furthermore, since the change in electric resistance occurs reversibly, the electric resistance is sharply reduced as the temperature is reduced. In other words, the rechargeable lithium ion battery can be reused without deteriorating the performance of the rechargeable lithium ion battery.

BRIEF DESCRIPTION OF THE DRAWINGS

FIG. 10 is a graph showing results of measurement for impedance.

EXPLANATION OF REFERENCE NUMERALS

Figure 1:
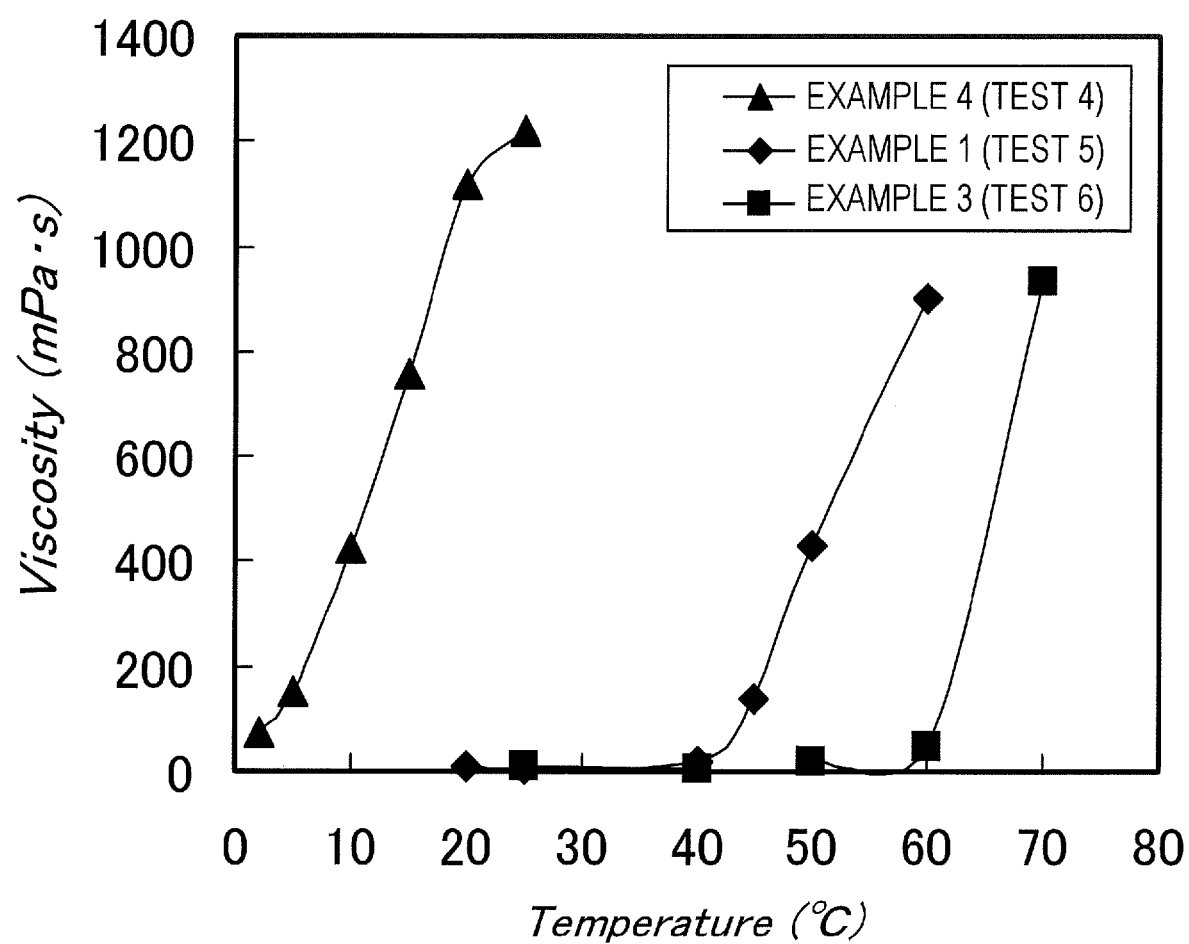
FIG. 1 is a graph showing a relationship between a temperature and a viscosity of the dispersion material to which the dispersant according to the present invention is added.

1 . . . damper, 3 . . . housing, 5 . . . mobile member, 7 . . . free piston, 9 . . . heater, 11 . . . cylinder, 13 . . . upper end plate, 15 . . . through-hole, 17 . . . sealing part, 19 . . . first fluid chamber, 21 . . . second fluid chamber, 23 . . . piston, 25 . . . piston rod, 27 . . . orifice, 31 . . . gas chamber, 33 . . . fluid, 41 . . . rotary damper, 43 . . . housing, 45 . . . mobile member, 47 . . . heater, 49 . . . fluid, 51 . . . shaft, 53 . . . rotor, 55 . . . plate, 57 . . . spacer, 59 . . . upper cover, 61 . . . lower cover, 63 . . . through-hole, 65 . . . sealing part, 71 . . . clutch, 73 . . . housing, 75 . . . mobile member, 77A, 77B . . . bearing, 79 . . . heater, 81 . . . shaft, 81A . . . tip, 83 . . . rotor, 85 . . . plate, 87 . . . spacer, 89 . . . journal, 91 . . . first cover, 93 . . . second cover, 95 . . . through-hole, 97 . . . sealing part, 99 . . . groove, 101 . . . fluid, 103, 015, 107 . . . device, 109 . . . cooler, 111, 113, 115, 121, 123, 125 . . . device, 127 . . . cooler, 131 . . . rechargeable lithium ion battery, 133 . . . positive electrode, 135 . . . negative electrode, 137 . . . separator, 139 . . . housing, 141 . . . positive electrode terminal, 143 . . . negative electrode terminal, 145 . . . fluid path, 147 . . . surface treatment agent.

MODES FOR CARRYING OUT THE INVENTION

The present invention will be hereinafter described regarding the embodiments.

The present invention has the primary object to change a contact state between a crystalline polymer and a non-crystalline polymer by using a copolymer of a first monomer having a high affinity for the crystalline polymer and a second monomer having a high affinity for a polar solvent in an environment where the crystalline polymer and the non-crystalline polymer are present in a mixed state. The description will be made, accordingly, regarding examples in which the copolymer is used as a dispersant and the copolymer is used as a surface treatment agent for a separator of a rechargeable lithium ion battery.

Constitution of Dispersant of Present Invention

The dispersant according to the present invention comprises a copolymer of at least two kinds of monomers, namely, a first monomer and a second monomer. The first monomer is a crystalline monomer that can remarkably reduce the viscosity of a dispersion material by adding the dispersant of the present invention to the dispersion material in which fine particles of a crystalline polymer having a molecular structure identical to that of a polymer obtained by crystallization of the first monomer are dispersed as dispersed particles. More specifically, the first monomer is a monomer that can be crystallized as a polymer having a molecular structure identical to that of a dispersed particle.

As the first monomer, those described below may be used. The substances described below may be used alone or in combination with plural kinds:

(A) Ethylene;

(B) any one of (meth)acrylate, (meth)acrylamide, vinyl ether, vinyl ester, siloxane, α-olefin, and substituted styrene each having a straight-chained alkyl group having at least 8 carbon atoms at a side chain;

(C) any one of (meth)acrylate, (meth)acrylamide, vinyl ether, vinyl ester, siloxane, α-olefin, and substituted styrene each having a straight-chained alkyl group having at least 8 carbon atoms at a side chain and being at least partially substituted with fluorine; and (D) polypropylene.

The dispersion material for which the dispersant can effectively exert a function of reducing viscosity is the one that contains fine particles of a crystalline polymer having a molecular structure identical to that of the first monomer as dispersed particles.

As the second monomer, those described below may be used. The substances described below may be used alone or in combination of plural kinds thereof:

(E) Any one of (meth)acrylate, vinyl ether, vinyl ester, maleic acid ester, itaconic acid ester, acrylamide, and substituted styrene, each having a straight-chained alkyl group having 7 carbon atoms or less;

(F) any one of (meth)acrylate, vinyl ether, vinyl ester, maleic acid ester, itaconic acid ester, acrylamide, and substituted styrene, each having a branched alkyl group;

(G) any one of (meth)acrylate, vinyl ether, vinyl ester, maleic acid ester, itaconic acid ester, and acrylamide, each having an aryl group;

(H) any one of (meth)acrylate, vinyl ether, vinyl ester, maleic acid ester, itaconic acid ester, acrylamide, and substituted styrene, each having an oxyethylene structure or an oxypropylene structure;

(I) styrene;

(J) acrylic acid;

(K) methacrylic acid;

(L) vinyl acetate;

(M) (meth)acrylate having a dimethyl siloxane group at a side chain; and (N) (meth)acrylate having a fluorinated alkyl group at a side chain.

The second monomer is not limited insofar as it is capable of forming a copolymer with the first monomer. A monomer having a high affinity for a dispersion medium of the dispersion material to which the dispersant is added may also be used as the second monomer.

In the case of using the dispersant of the present invention for a dispersion material obtainable by using fine particles of a polyethylene-based or nylon-based crystalline polymer as the dispersed particles, the first monomer may be a (meth)acrylate having a straight-chained alkyl group of at least 8 carbon atoms at a side chain, or ethylene, and the second monomer may be any one of a (meth)acrylate having a straight-chained alkyl group of 7 carbon atoms or less, a (meth)acrylate having a branched alkyl group, a (meth)acrylate having an aryl group, a (meth)acrylate having an oxyethylene structure, or vinyl acetate.

Further, the first monomer may be a (meth)acrylate having a straight-chained alkyl group with at least 12 carbon atoms at a side chain.

In the case of using the dispersant of the present invention for the dispersion material obtainable by using fine particles comprising a polyfluoroethylene-based crystalline polymer as the dispersed particles, the first monomer may be (meth)acrylate having a straight-chained alkyl group of at least 8 carbon atoms at a side chain or ethylene and at least partially substituted with fluorine, and the second monomer may be any one of (meth)acrylates, each having a straight-chained alkyl group having 7 carbon atoms or less, a branched alkyl group, an aryl group and an oxyethylene structure.

Production of Dispersant

Example 1

2-methyl-2-[N-(t-butyl)-N-(diethoxyphosphonyl-2-2-dimethylpropyl)aminoxy]propionic acid (abbreviated to SG-1-MA, 3.81 g, 10.0 mmol), stearyl acrylate (50.0 g, 151.7 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, normal butyl acrylate (50.0 g, 390.1 mmol) subjected to a $N_2$ bubbling treatment for 20 minutes and n-butyl acetate (12.5 g) were added to the reaction vessel, and the reaction was continued at 118° C. The reaction was terminated 5 hours after the addition of normal butyl acrylate to obtain a block copolymer (dispersant). A weight average molecular weight of the block copolymer was Mw=11,800.

The stearyl acrylate is one example of the first monomer of the present invention, and the normal butyl acrylate is one example of the second monomer of the present invention.

A chemical formula of SG-1-MA is shown under (Chem. 1).

[Chem. 1]

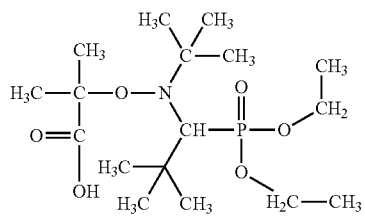

Example 2

SG-1-MA (3.81 g, 10.0 mmol), stearyl acrylate (50.0 g, 151.7 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, benzyl acrylate (50.0 g, 308.2 mmol) subjected to a $N_2$ bubbling treatment for 20 minutes and n-butyl acetate (12.5 g) were added to the reaction vessel, and the reaction was continued at 118° C. The reaction was terminated 5 hours after the addition of benzyl acrylate to obtain a block copolymer (dispersant). A weight average molecular weight of the block copolymer was Mw=12,600.

The stearyl acrylate is one example of the first monomer of the present invention, and the benzyl acrylate is one example of the second monomer of the present invention.

Example 3

SG-1-MA (3.81 g, 10.0 mmol), behenyl acrylate (50.0 g, 131.0 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, normal butyl acrylate (50.0 g, 390.1 mmol) subjected to a $N_2$ bubbling treatment for 20 minutes and n-butyl acetate (12.5 g) were added to the reaction vessel, and the reaction was continued at 118° C. The reaction was terminated 5 hours after the addition of normal butyl acrylate to obtain a block copolymer (dispersant). A weight average molecular weight of the block copolymer was Mw=12500.

The behenyl acrylate is one example of the first monomer of the present invention, and the normal butyl acrylate is one example of the second monomer of the present invention.

Example 4

SG-1-MA (3.81 g, 10.0 mmol), lauryl acrylate (50.0 g, 208.0 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, normal butyl acrylate (50.0 g, 390.1 mmol) subjected to a $N_2$ bubbling treatment for 20 minutes and n-butyl acetate (12.5 g) were added to the reaction vessel, and the reaction was continued at 118° C. The reaction was terminated 5 hours after the addition of normal butyl acrylate to obtain a block copolymer (dispersant). A weight average molecular weight of the block copolymer was Mw=11,500.

The lauryl acrylate is one example of the first monomer of the present invention, and the normal butyl acrylate is one example of the second monomer of the present invention.

Example 5

SG-1-MA (3.81 g, 10.0 mmol), stearyl acrylate (30.0 g, 91.0 mmol), and n-butyl acetate (7.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, normal butyl acrylate (50.0 g, 390.1 mmol) subjected to a $N_2$ bubbling treatment for 20 minutes and n-butyl acetate (12.5 g) were added to the reaction vessel, and the reaction was continued at 118° C. The reaction was terminated 5 hours after the addition of normal butyl acrylate to obtain a block copolymer (dispersant). A weight average molecular weight of the block copolymer was Mw=10,800.

The stearyl acrylate is one example of the first monomer of the present invention, and the normal butyl acrylate is one example of the second monomer of the present invention.

Example 6

SG-1-MA (3.81 g, 10.0 mmol), stearyl acrylate (50.0 g, 151.7 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, normal butyl acrylate (30.0 g, 234.0 mmol) subjected to a $N_2$ bubbling treatment for 20 minutes and n-butyl acetate (7.5 g) were added to the reaction vessel, and the reaction was continued at 118° C. The reaction was terminated 4 hours after the addition of normal butyl acrylate to obtain a block copolymer (dispersant). A weight average molecular weight of the block copolymer was Mw=9,500.

The stearyl acrylate is one example of the first monomer of the present invention, and the normal butyl acrylate is one example of the second monomer of the present invention.

Example 7

SG-1-MA (3.81 g, 10.0 mmol), stearyl acrylate (50.0 g, 151.7 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, dimethylamino acrylate (30.0 g, 175.0 mmol) subjected to a $N_2$ bubbling treatment for 20 minutes and n-butyl acetate (7.5 g) were added to the reaction vessel, and the reaction was continued at 118° C. The reaction was terminated 4 hours after the addition of dimethylamino acrylate to obtain a block copolymer (dispersant). A weight average molecular weight of the block copolymer was Mw=7,670.

The stearyl acrylate is one example of the first monomer of the present invention, and the dimethyl amino acrylate is one example of the second monomer of the present invention.

Example 8

SG-1-MA (3.81 g, 10.0 mmol), stearyl acrylate (50.0 g, 151.7 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, terminal methoxy polyethylene glycol (n=9) acrylate (25.0 g, 55.0 mmol) and normal butyl acrylate (25.0 g, 195.0 mmol) subjected to a $N_2$ bubbling treatment for 20 minutes and n-butyl acetate (12.5 g) were added to the reaction vessel, and the reaction was continued at 118° C. The reaction was terminated 5 hours after the addition of normal butyl acrylate to obtain a block copolymer (dispersant). A weight average molecular weight of the block copolymer was Mw=11,300.

The stearyl acrylate is one example of the first monomer of the present invention, and the terminal methoxy polyethylene glycol (n=9) acrylate and the normal butyl acrylate are examples of the second monomer of the present invention.

Example 9

SG-1-MA (3.81 g, 10.0 mmol), stearyl acrylate (50.0 g, 151.7 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, polydimethyl siloxane methacrylate (molecular weight: about 1000) (50.0 g, 50.0 mmol) subjected to a $N_2$ bubbling treatment for 20 minutes and n-butyl acetate (12.5 g) were added to the reaction vessel, and the reaction was continued at 118° C. The reaction was terminated 5 hours after the addition of polydimethyl siloxane methacrylate to obtain a block copolymer (dispersant). A weight average molecular weight of the block copolymer was Mw=14,300.

The stearyl acrylate is one example of the first monomer of the present invention, and the polydimethyl siloxane methacrylate is one example of the second monomer of the present invention.

Example 10

SG-1-MA (3.81 g, 10.0 mmol), stearyl acrylate (30.0 g, 91.0 mmol), and n-butyl acetate (7.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, normal butyl acrylate (370.0 g, 2886 mmol) subjected to a $N_2$ bubbling treatment for 20 minutes was added to the reaction vessel, and the reaction was continued at 118° C. Six hours after the addition of normal butyl acrylate, azobisisobutyronitrile (0.15 g) was added 3 times at an interval of 15 minutes, and then the reaction was terminated to obtain a block copolymer (dispersant). A weight average molecular weight of the block copolymer was Mw=56,000.

The stearyl acrylate is one example of the first monomer of the present invention, and the normal butyl acrylate is one example of the second monomer of the present invention.

Example 11

SG-1-MA (3.81 g, 10.0 mmol), stearyl acrylate (30.0 g, 91.0 mmol), and n-butyl acetate (7.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, normal butyl acrylate (170.0 g, 1326 mmol) subjected to a $N_2$ bubbling treatment for 20 minutes was added to the reaction vessel, and the reaction was continued at 118° C. Six hours after the addition of normal butyl acrylate, azobisisobutyronitrile (0.15 g) was added 3 times at an interval of 15 minutes, and then the reaction was terminated to obtain a block copolymer (dispersant). A weight average molecular weight of the block copolymer was Mw=27,400.

The stearyl acrylate is one example of the first monomer of the present invention, and the normal butyl acrylate is one example of the second monomer of the present invention.

Example 12

SG-1-MA (3.81 g, 10.0 mmol), stearyl acrylate (100.0 g, 308 mmol), and n-butyl acetate (25 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, normal butyl acrylate (50.0 g, 390 mmol) subjected to a $N_2$ bubbling treatment for 20 minutes was added to the reaction vessel, and the reaction was continued at 118° C. The reaction was terminated 5 hours after the addition of normal butyl acrylate to obtain a block copolymer (dispersant). A weight average molecular weight of the block copolymer was Mw=9,900.

The stearyl acrylate is one example of the first monomer of the present invention, and the normal butyl acrylate is one example of the second monomer of the present invention.

Example 13

SG-1-MA (7.63 g, 20.0 mmol), stearyl acrylate (40.0 g, 121.3 mmol), and n-butyl acetate (10.0 g) were put into a reaction vessel, followed by $N_2$ bubbling for 20 minutes. After that, the reaction was conducted by continuing the $N_2$ bubbling and maintaining a temperature of the reaction liquid to 118° C. Three and a half hours later, normal butyl acrylate (60.0 g, 468.1 mmol) subjected to a $N_2$ bubbling treatment for 20 minutes was added to the reaction vessel, and the reaction was continued at 118° C. The reaction was terminated 3 hours after the addition of normal butyl acrylate to obtain a block copolymer (dispersant). A weight average molecular weight of the block copolymer was Mw=6,500.

The stearyl acrylate is one example of the first monomer of the present invention, and the normal butyl acrylate is one example of the second monomer of the present invention.

Example 14

SG-1-MA (3.81 g, 10.0 mmol), heptadecafluorodecyl acrylate (50.0 g, 96 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. Four hours later, normal butyl acrylate (50.0 g, 390 mmol) subjected to a $N_2$ bubbling treatment for 20 minutes and n-butyl acetate (12.5 g) were added to the reaction vessel, and the reaction was continued at 118° C. The reaction was terminated 5 hours after the addition of normal butyl acrylate to obtain a block copolymer (dispersant). A weight average molecular weight of the block copolymer was Mw=9,100.

The heptadecafluorodecyl acrylate is one example of the first monomer of the present invention, and the normal butyl acrylate is one example of the second monomer of the present invention.

Example 15

Iodine (1.27 g, 5.0 mmol), azobisisobutyronitrile (2.46 g, 15 mmol), stearyl methacrylate (50.0 g, 148 mmol), cyclohexadiene (0.04 g, 0.5 mmol), and n-butyl acetate (50 g) were put into a reaction vessel, followed by $N_2$ bubbling for 20 minutes. After that, the reaction was conducted by continuing the $N_2$ bubbling and maintaining a temperature of the reaction liquid to 80° C. Four hours later, normal butyl methacrylate (50.0 g, 352 mmol) subjected to a $N_2$ bubbling treatment for 20 minutes, azobisisobutyronitrile (0.33 g, 2.0 mmol), cyclohexadiene (0.04 g, 0.5 mmol), and n-butyl acetate (50 g) were added to the reaction vessel, and the reaction was continued at 80° C. The reaction was terminated 3 hours after the addition of normal butyl methacrylate to obtain a block copolymer (dispersant). A weight average molecular weight of the block copolymer was Mw=11,700.

The stearyl methacrylate is one example of the first monomer of the present invention, and the normal butyl methacrylate is one example of the second monomer of the present invention.

Comparative Example 1

SG-1-MA (1.91 g, 5.0 mmol), stearyl acrylate (50.0 g, 151.7 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. The reaction was terminated 5 hours later to obtain a stearyl acrylate homopolymer (dispersant). A weight average molecular weight of the homopolymer was Mw=10,400.

Comparative Example 2

SG-1-MA (3.81 g, 10.0 mmol), stearyl acrylate (50.0 g, 151.7 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. The reaction was terminated 5 hours later to obtain a stearyl acrylate homopolymer (dispersant). A weight average molecular weight of the homopolymer was Mw=6,900.

Comparative Example 3

SG-1-MA (6.34 g, 16.6 mmol), stearyl acrylate (50.0 g, 151.7 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. The reaction was terminated 4 hours later to obtain a stearyl acrylate homopolymer (dispersant). A weight average molecular weight of the homopolymer was Mw=4,600.

Comparative Example 4

SG-1-MA (3.81 g, 10.0 mmol), lauryl acrylate (50.0 g, 208.0 mmol), and n-butyl acetate (12.5 g) were put into a reaction vessel, followed by $N_2$ bubbling for 20 minutes. After that, the reaction was conducted by continuing the $N_2$ bubbling and maintaining a temperature of the reaction liquid to 118° C. The reaction was terminated 5 hours later to obtain a lauryl acrylate homopolymer (dispersant). A weight average molecular weight of the homopolymer was Mw=6,700.

Example 16

SG-1-MA (3.81 g, 10.0 mmol), normal butyl acrylate (30.0 g, 234.0 mmol), stearyl acrylate (70.0 g, 215.7 mmol), and n-butyl acetate (25 g) were put into a reaction vessel, followed by $N_2$ bubbling for 20 minutes. After that, the reaction was conducted by continuing the $N_2$ bubbling and maintaining a temperature of the reaction liquid to 118° C. The reaction was terminated 5 hours later to obtain a stearyl acrylate-normal butyl acrylate random polymer (dispersant, random sequence polymer). A weight average molecular weight of the random polymer was Mw=11,400.

The stearyl acrylate is one example of the first monomer of the present invention, and the normal butyl acrylate is one example of the second monomer of the present invention.

Example 17

SG-1-MA (3.81 g, 10.0 mmol), normal butyl acrylate (10.0 g, 78.0 mmol), stearyl acrylate (90.0 g, 277.3 mmol), and n-butyl acetate (25 g) were put into a reaction vessel, followed by $N_2$ bubbling for 20 minutes. After that, the reaction was conducted by continuing the $N_2$ bubbling and maintaining a temperature of the reaction liquid to 118° C. The reaction was terminated 5 hours later to obtain a stearyl acrylate-normal butyl acrylate random polymer (random sequence polymer) (dispersant). A weight average molecular weight of the random polymer was Mw=11,400.

The stearyl acrylate is one example of the first monomer of the present invention, and the normal butyl acrylate is one example of the second monomer of the present invention.

Example 18

SG-1-MA (2.29 g, 6.0 mmol), normal butyl acrylate (30.0 g, 234.0 mmol), stearyl acrylate (30.0 g, 91.0 mmol), and n-butyl acetate (15 g) were put into a reaction vessel, followed by $N_2$ bubbling for 20 minutes. After that, the reaction was conducted by continuing the $N_2$ bubbling and maintaining a temperature of the reaction liquid to 118° C. The reaction was terminated 5 hours later to obtain a stearyl acrylate-normal butyl acrylate random polymer (random sequence polymer) (dispersant). A weight average molecular weight of the random polymer was Mw=11,600.

The stearyl acrylate is one example of the first monomer of the present invention, and the normal butyl acrylate is one example of the second monomer of the present invention.

Example 19

After conducting a reaction of stearyl acrylate (33.7 g), butyl acrylate (33.7 g), n-butyl acetate (72.5 g), and azoisobutyronitrile (AIBN) (1.0 g) at 105° C. under $N_2$ bubbling for 3.5 hours, azobisisobutyronitrile (0.15 g) was added 3 times at an interval of 15 minutes, and then the reaction was terminated to obtain a random copolymer (dispersant). A weight average molecular weight of the random copolymer was Mw=13,200.

The stearyl acrylate is one example of the first monomer of the present invention, and the butyl acrylate is one example of the second monomer of the present invention.

Example 20

After conducting a reaction of stearyl acrylate (42.9 g), butyl acrylate (18.3 g), n-butyl acetate (75 g), and azoisobutyronitrile (AIBN) (0.91 g) at 105° C. under $N_2$ bubbling for 3.5 hours, azobisisobutyronitrile (0.15 g) was added 3 times at an interval of 15 minutes, and then the reaction was terminated to obtain a random copolymer (dispersant). A weight average molecular weight of the random copolymer was Mw=14,300.

The stearyl acrylate is one example of the first monomer of the present invention, and the butyl acrylate is one example of the second monomer of the present invention.

Example 21

After conducting a reaction of stearyl acrylate (18.36 g), butyl acrylate (42.84 g), n-butyl acetate (75 g), and azoisobutyronitrile (AIBN) (0.91 g) at 105° C. under $N_2$ bubbling for 3.5 hours, azobisisobutyronitrile (0.15 g) was added 3 times at an interval of 15 minutes, and then the reaction was terminated to obtain a random copolymer (dispersant). A weight average molecular weight of the random copolymer was Mw=15,700.

The stearyl acrylate is one example of the first monomer of the present invention, and the butyl acrylate is one example of the second monomer of the present invention.

Comparative Example 5

After conducting a reaction of butyl acrylate (61.2 g), n-butyl acetate (75 g), and azoisobutyronitrile (AIBN) (0.91 g) at 105° C. under $N_2$ bubbling for 3.5 hours, azobisisobutyronitrile (0.15 g) was added 3 times at an interval of 15 minutes, and then the reaction was terminated to obtain a homopolymer (dispersant). A weight average molecular weight of the homopolymer was Mw=16,900.

Property Evaluation of Dispersant

Properties of the dispersants were evaluated by the following tests. Outlines of the tests are described below.
Test 1: Evaluation of a property when used for a dispersant in which fine particles comprising a polyethylene-based crystalline polymer or a polyamide-based crystalline polymer are dispersed as a dispersed particle.
Test 2: Evaluation of a property when used for a dispersion material having fine particles of a fluorine-based resin (polytetrafluoroethylene) as dispersed particles (change in viscosity caused by a temperature).
Test 3: Comparative evaluation conducted by using the block copolymer, random copolymer, and homopolymer as the dispersants and comparative evaluation conducted by using the acrylate-based and methacrylate-based dispersants.
Tests 4 to 6: Evaluations of properties conducted by varying a length of an alkyl chain of alkyl acrylate used for the dispersant (change in viscosity caused by a temperature).
Tests 7 to 9: Evaluations of properties conducted by varying a dispersion medium.
Test 10: Evaluation of a property when EVA (ethylene-vinyl acetate copolymer) is used as the dispersant.
Contents of the tests are described in detail below.

Test 1

A dispersion material having a solid content of 40 to 52% by weight was prepared by using N-butyl acetate as a dispersion medium and mixing fine particles of crystalline polymers (a) to (d) described below, respectively, with the dispersion medium:
(a) Ceridust 3620 (HDPE (high density polyethylene) wax powder manufactured by Clariant);
(b) ME0520 (LDPE (low density polyethylene) wax powder manufactured by DEUREX AG);
(c) Mipelon PM200 (ultrahigh molecular weight PE powder manufactured by Mitsui Chemicals, Inc.); and
(d) GPA-500 (nylon 12 powder manufactured by Gantsu Kasei K. K.).

The solid contents of the dispersion materials were: (a) 40% by weight, (b) 45% by weight, (c) 50% by weight, and (d) 5% by weight. A n-butyl acetate solution (solid content: 50% by weight) of the resin (dispersant) prepared in Example 1 was added to each of the dispersion materials (a) to (d) in such an amount that the solid content of the dispersant is 1% by weight relative to the entire amount of the dispersion material, and changes in viscosity before and after the addition were measured. The temperature of each of the dispersion materials was 25° C., and the viscosity was measured by using a B type viscometer manufactured by Toki Sangyo Co., Ltd. (same was applied to the following tests).

The measured viscosities and change ratios are shown in Table 1.

TABLE 1

| Crystalline Fine Particles | | | Viscosity Before Addition [mPa · s] | Viscosity After Addition [mPa · s] | Change Ratio [%] |
|---|---|---|---|---|---|
| Product Name | Raw Material | NV [%] | | | |
| (a) Ceridust 3620 | HDPE | 40 | 1360 | 6.2 | 99.5 |
| (b) ME 0520 | LDPE | 45 | 311 | 15 | 95.2 |
| (c) Mipelon PM200 | Ultrahigh Molecular Weight PE | 50 | 830 | 15 | 98.2 |
| (d) GPA-550 | Nylon 12 | 52 | 734 | 95 | 87.1 |

As shown in Table 1, the viscosity of each dispersion material is found remarkably lowered.

Test 2

A dispersion material having a solid content of 40% by weight was prepared by using LUBRON L2 (PTFE (polytetrafluoroethylene) powder manufactured by Daikin Industries, Ltd.) as fine particles of the crystalline polymer and mixing it with n-butyl acetate. To the resulting dispersion material was added a n-butyl acetate solution (solid content: 50% by weight) of the resin (dispersant) prepared in Example 14 in such an amount that the solid content of the dispersant was made 1% by weight relative to the entire amount of the dispersion material, and the dispersion material was measured for changes in viscosity as the temperature of the dispersion material was changed. The viscosity of the dispersion material of LUBRON L2 before the addition of the dispersant was 1,160 mPa·s at 25° C.

The measured viscosities and change ratios are shown in Table 2.

TABLE 2

| Temperature [° C.] | Viscosity Before Addition [mPa · s] | Viscosity After Addition [mPa · s] | Change Ratio [%] |
|---|---|---|---|
| 25 | 1160 | 650 | 43.9 |
| 20 | 1160 | 362 | 68.7 |
| 15 | 1160 | 245 | 78.8 |
| 10 | 1160 | 116 | 90.0 |
| 5 | 1160 | 32 | 97.2 |

As is apparent from Table 2, the viscosity of the dispersion material was found remarkably reduced along with the reduction in temperature.

Test 3

A dispersion material having a solid content of 40% by weight was prepared by using Ceridust 3620 (HDPE powder manufactured by Clariant) as fine particles of crystalline polymer and mixing it with n-butyl acetate. To the resulting dispersion material, a n-butyl acetate solution (solid content: 50% by weight) of each of the dispersants described below as (e) to (k) was added in such an amount that the solid content of the dispersant was made 1% by weight relative to the entire amount of the dispersion material, and the dispersion material was measured for changes in viscosity of before and after the addition. The temperature of each of the dispersion materials was 25° C.

(e) StA-b-BA (Example 1);

(f) StA-b-BzA (Example 2);

(g) SMA-b-BMA (Example 15);

(h) Random StA/BA (5/5) (Example 18);

(i) Random StA/BA (7/3) (Example 16);

(j) StA homopolymer (Comparative Example 1); and (k) BA homopolymer (Comparative Example 5).

StA represents stearyl acrylate; BA represents normal butyl acrylate; BzA represents benzyl acrylate; SMA represents stearyl methacrylate; and BMA represents normal butyl methacrylate.

The measured viscosities are shown in Table 3.

TABLE 3

| Dispersants | | Viscosity Before Addition | Viscosity After Addition | Change Ratio |
|---|---|---|---|---|
| | Structure | [mPa · s] | [mPa · s] | [%] |
| (e) | StA-b-BA | 1430 | 7.3 | 99.4 |
| (f) | StA-b-BzA | 1430 | 16.7 | 98.8 |
| (g) | SMA-b-BMA | 1430 | 14.2 | 99.0 |
| (h) | Random StA/BA (5/5) | 1430 | 203 | 85.8 |
| (i) | Random StA/BA (7/3) | 1430 | 21 | 98.5 |
| (j) | StA Homopolymer | 1430 | 513 | 64.1 |
| (k) | BA Homopolymer | 1430 | 938 | 34.4 |

As shown in Table 3, the viscosity was reduced in each of the dispersion materials to which the dispersants (e) to (k) were added, and the viscosity is prominently reduced in the dispersion materials to which the dispersants of the copolymers (e) to (i) were added.

Test 4

A dispersion material having a solid content of 40% was prepared by mixing Ceridust 3620 (HDPE powder manufactured by Clariant) as fine particles of crystalline polymer with n-butyl acetate. To the resulting dispersion material was added a n-butyl acetate solution (solid content: 50% by weight) of the LA-b-BA resin (dispersant, melting point: 11° C.) prepared in Example 4 in such an amount that the solid content of the dispersant was made 1% by weight relative to the entire amount of the dispersion material, and a change of the viscosity of the dispersion material was measured as the temperature of the dispersion material was changed. The viscosity of the dispersant before the addition of the dispersant was 1,430 mPa·s at 25° C.

The measured viscosities are shown in Table 4.

TABLE 4

| Structure of Dispersant | Temperature [° C.] | Viscosity After Addition [mPa · s] |
|---|---|---|
| LA-b-BA | 2 | 75 |
| | 5 | 153 |
| | 10 | 426 |
| | 15 | 758 |
| | 20 | 1116 |
| | 25 | 1219 |

As is apparent from Table 4, the viscosity of the dispersion material was found remarkably reduced along with the reduction in temperature.

Test 5

Ceridust 3620 (HDPE powder manufactured by Clariant) as fine particles of crystalline polymer was mixed with n-butyl acetate to yield a dispersion material having a solid content of 40%. To the resulting dispersion material was added a n-butyl acetate solution (solid content: 50% by weight) of the StA-b-BA resin (dispersant, melting point: 53° C.) prepared in Example 1 in such an amount that the solid content of the dispersant was made 1% by weight relative to the entire amount of the dispersion material. The dispersion material was measured for changes in viscosity as the temperature of the dispersion material. The viscosity of the dispersion material before the addition of the dispersant was 1,430 mPa·s at 25° C.

The measured viscosities are shown in Table 5.

TABLE 5

| Structure of Dispersant | Temperature [° C.] | Viscosity After Addition [mPa · s] |
|---|---|---|
| StA-b-BA | 20 | 7.3 |
| | 25 | 6.2 |
| | 40 | 16.7 |
| | 45 | 140 |
| | 50 | 428 |
| | 60 | 901 |

As is apparent from Table 5, the viscosity of the dispersant was found remarkably reduced along with the reduction in temperature.

Test 6

Ceridust 3620 (HDPE powder manufactured by Clariant) as fine particles of crystalline polymer was mixed with n-butyl acetate to yield a dispersion material having a solid content of 40%. To the resulting dispersion material was added a n-butyl acetate solution (solid content: 50% by weight) of the VA-b-BA resin (dispersant, melting point: 63° C.) prepared in Example 3 in such an amount that the solid content of the dispersant was made 1% by weight relative to the entire amount of the dispersion material. The dispersion material was measured for changes of viscosity as the temperature of the dispersion material was changed. The viscosity of the dispersion material before the addition of the dispersant was 1,430 mPa·s at 25° C.

The measured viscosities are shown in Table 6.

TABLE 6

| Structure of Dispersant | Temperature [° C.] | Viscosity After Addition [mPa · s] |
|---|---|---|
| VA-b-BA | 25 | 9.5 |
|  | 40 | 5.9 |
|  | 50 | 18.7 |
|  | 60 | 47.7 |
|  | 70 | 933 |

As is apparent from Table 6, the viscosity of the dispersion material was found remarkably reduced along with the reduction in temperature.

FIG. 1 is a graph showing the relationship between the temperatures and the viscosities for Tests 4 to 6. FIG. 1 reveals that the viscosity was sharply changed in the narrow temperature range.

It is also revealed that the temperature range in which the viscosity changed moves to the higher temperature side as long as the length of the alkyl chain of the alkyl acrylate was made longer.

Further, in the above-described tests, the viscosity of the dispersion material changed reversibly by changing the temperature. More specifically, the dispersion material of the present invention can realize adjustment of the viscosity in such a manner that the viscosity of the dispersion material is increased by elevating the temperature of the dispersion material and the viscosity thereof is reduced by lowering the temperature thereof.

Test 7

Dispersion materials, each having a solid content of 40% by weight were prepared by using Ceridust 3620 (HDPE powder manufactured by Clariant) as fine particles of crystalline polymer and mixing it with each of dispersion mediums (l) to (q) described below:

(l) N-butyl acetate;
(m) methylcyclohexane (MCH);
(n) ethyl acetate;
(o) methyl ethyl ketone (MEK);
(p) butylcellosolve; and
(q) Isopropyl alcohol (IPA).

To each of the resulting dispersion material was added a n-butyl acetate solution (solid content: 50% by weight) of the resin (dispersant) prepared in Example 1 in such an amount that the solid content of the dispersant was made 1% by weight relative to the entire amount of the dispersion material. The changes of the viscosity before and after the addition were measured. The temperature of each of the dispersion material was 25° C.

The measured viscosities and change ratios are shown in Table 7.

TABLE 7

| | Dispersion Medium | Viscosity Before Addition | Viscosity After Addition | Change Ratio |
|---|---|---|---|---|
| | Substance Name | [mPa · s] | [mPa · s] | [%] |
| (l) | n-Butyl acetate | 1430 | 1 | 99.4 |
| (m) | MCH | 795 | 12 | 98.5 |

TABLE 7-continued

| | Dispersion Medium | Viscosity Before Addition | Viscosity After Addition | Change Ratio |
|---|---|---|---|---|
| | Substance Name | [mPa · s] | [mPa · s] | [%] |
| (n) | Ethyl acetate | 1018 | 11 | 98.9 |
| (o) | MEK | 1093 | 10 | 99.1 |
| (p) | Butyl Cellosolve | 1490 | 21 | 98.5 |
| (q) | IPA | 1594 | 56 | 96.5 |

As shown in Table 7, the viscosity was found remarkably reduced in each of the dispersion materials.

Test 8

A dispersion material having a PE solid content of 30% (viscosity: 34,000 mPa·s) was prepared by using Ceridust 3620 (HDPE powder manufactured by Clariant) as fine particles of crystalline polymer and mixing it with pentaerythritol tetraethoxy acrylate (Ebecryl 40 manufactured by Daicel-Cytec Company Ltd.). To the resulting dispersion material was added a n-butyl acetate solution (solid content: 50% by weight) of the resin (dispersant) prepared in Example 8 in such an amount that the solid content of the dispersant was made 1% by weight relative to the entire amount of the dispersion material. The viscosity of the dispersion material became 1,258 mPa·s at 25° C.

Test 9

A glass vessel was filled with 270 g of Ceridust 3620 (HDPE powder manufactured by Clariant) as fine particles of crystalline polymer, 30 g of the resin prepared in Example 8, and 300 g of water and heated to 60° C. with stirring, followed by water cooling, thereby obtaining an aqueous PE powder dispersion material. The viscosity was 201 mPa·s.

A phenomenon was confirmed that the viscosity of the dispersant was sharply increased when the dispersion material was heated to 50° C.

Test 10

A dispersion material having a solid content of 40% was prepared by using Ceridust 3620 (HDPE powder manufactured by Clariant) as fine particles of crystalline polymer and mixing it with n-butyl acetate. To the resulting dispersion material was added a predetermined amount of a n-butyl acetate solution (solid content: 20% by weight) in which EVA (ethylene-vinyl acetate copolymer) was dissolved by heating. The dispersion material was measured for changes of viscosity by changing the temperature of the dispersion material.

The measured viscosities of the dispersion materials containing varied amounts at 25° C. are shown in Table 8. In the table, the added amount is represented as a ratio (% by weight) of the EVA solid part relative to the entire amount of the dispersion material.

In the table, VA represents a composition ratio (% by weight) of vinyl acetate, mp represents the melting point, and MFR represents a melt flow rate. Evaflex is a registered trademark of Du Pont-Mitsui Polychemicals Co., Ltd.

TABLE 8

| EVA (Product Name) | VA [%] | Mp [° C.] | MFR [g/ 10 cm] | Viscosity [mPa · s] | | |
|---|---|---|---|---|---|---|
| | | | | Before Addition | After 0.1% Addition | After 0.3% Addition |
| EVAFLEX EV45X | 46 | — | 100 | 1650 | 12 | — |
| EVAFLEX EV210 | 28 | 62 | 400 | 1650 | 130 | 10 |

As shown in Table 8, the viscosity of the dispersion material was prominently reduced with the use of either EVA.

Mobile Device using Dispersion Material of Present Invention

The dispersion material to which the dispersant of the present invention is added can be used satisfactorily for mobile devices. Examples of the mobile devices may include a damper, a rotary damper, a clutch, and the like.

In the case of the use for the mobile device, an ordinary organic solvent may be used as a dispersion medium, but a high melting point solvent having a small vapor pressure at an ordinary temperature is preferably used. Examples of the high melting point solvent may include hydrocarbon oils, phenyl ethers, polyol polyesters, phosphate esters, silicone oil, fluorine oil, and the like.

Specific examples of the hydrocarbon oils may include fluid paraffin, mineral oil, spindle oil, higher alkyl benzene, higher alkyl naphthalene, polybutene, poly-α-olefin oil, and the like. Specific examples of the phenyl ethers may include alkyl diphenyl ether, alkyl triphenyl ether, and the like.

Specific examples of the polyol polyesters may include dicarboxylic acid ester such as dioctyl azelate, dioctyl adipate, dioctyl sebacate, dibutyl phthalate, and dihexyl maleate, trimethylolpropane n-heptyl ester, pentaerythritol tetra-2-ethylhexyl ester, and the like.

Specific examples of the phosphate esters may include tributyl phosphate ester, tri-2-ethylhexyl phosphate ester, tricresyl phosphate ester, trixylyl phosphate ester, triallyl phosphate ester, and the like.

Specific examples of the silicone oils may include dimethyl silicone oil, methyl hydrogen polysiloxane, methylphenyl silicone oil, α-methylstyrene-modified silicone oil, alcohol-modified silicone oils, amine-modified silicone oils, polyether-modified silicone oils, chlorinated silicone oils, fluorinated silicone oils, and the like. Specific examples of fluorinated oils may include perfluoropolyether, trifluorinated chlorinated ethylene oil, and the like.

In the case of using the silicone oils as the dispersion medium, it is contemplated to select the (meth)acrylate having a high affinity for the silicone oils and dimethyl siloxane group at a side chain as the second monomer. In the case of using the fluorine oils as the dispersion medium, it is contemplated to select the (meth)acrylate having a high affinity for the fluorine oils and fluorinated alkyl group at a side chain as the second monomer.

A description will be made regarding examples of the preparation of the dispersion material to be used for the mobile devices.

Example 22

A dispersion material having a solid content of 35% by weight was prepared by mixing TD oil 10 (hydrocarbon oil; manufactured by JX Nippon Oil and Energy Corporation) used as the dispersion medium and fine particles of crystalline polymer of Ceridust 3620 (HDPE (high density polyethylene) wax powder manufactured by Clariant) used as dispersed particles.

To the resulting dispersion material was added a n-butyl acetate solution (solid content: 50% by weight) of the resin (dispersant) prepared in Example 5 in such an amount that the solid content of the dispersion material was made 2.9% by weight relative to Ceridust 3620. This was used as Sample 1. Another material was prepared by adding a n-butyl acetate solution (solid content: 50% by weight) of the resin (dispersant) synthesized in Example 1 to the resulting dispersion material in place of the above-described dispersant in such an amount that the solid content of the dispersant was made 2.9% by weight relative to Ceridust 3620. This was used as Sample 2.

Changes in viscosity of each of Samples 1 and 2 were measured by varying the temperature of each of Samples 1 and 2. The viscosity was measured by using a B type viscometer manufactured by Toki Sangyo Co., Ltd. The viscosity of Sample 1 before the addition of the dispersant was 1,531 mPa·s at 25° C., and the viscosity of Sample 2 was 1,840 mPa·s at 25° C.

Figure 2:
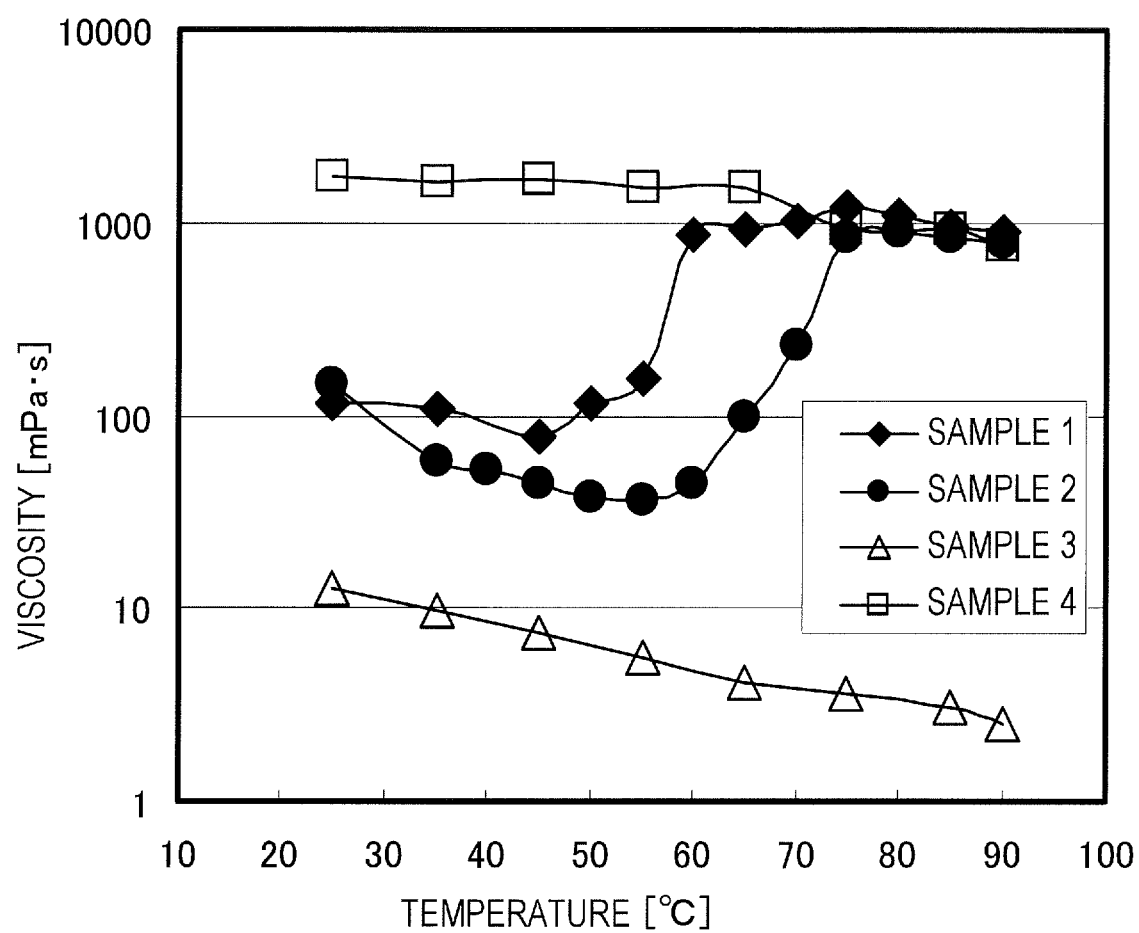
FIG. 2 is a graph showing a relationship between a temperature and a viscosity of the dispersion material to which the dispersant of the present invention is added.

The results of measurements are shown in Table 9. FIG. 2 is a graph showing the relationship between the temperature and the viscosity. Sample 3 in the table and the graph shows the changes in viscosity of TD oil 10 alone, and Sample 4 shows the changes in viscosity of the material obtained by adding Ceridust 3620 to TD oil 10.

TABLE 9

| Temp. [° C.] | Sample Nos. | | | |
|---|---|---|---|---|
| | Sample 1 | Sample 2 | Sample 3 | Sample 4 |
| 25 | 116.9 | 144.4 | 12.5 | 1764 |
| 35 | 108.9 | 58.4 | 9.8 | 1619 |
| 40 | — | 51.8 | | |
| 45 | 78.7 | 44 | 7.4 | 1677 |
| 50 | 114.9 | 38.1 | | |
| 55 | 158.3 | 37.1 | 5.5 | 1548 |
| 60 | 868 | 43.9 | | |
| 65 | 930 | 98 | 4.2 | 1546 |
| 70 | 1023 | 231 | | |
| 75 | 1224 | 853 | 3.6 | 938 |
| 80 | 1109 | 912 | | |
| 85 | 958 | 841 | 3.1 | 921 |
| 90 | 889 | 781 | 2.5 | 769 |

As is apparent from Table 9, the viscosity is increased along with the elevation of the temperature within the predetermined temperature range in each of Samples 1 and 2. The changes in viscosity are reversible so that the viscosity is reduced when the temperature is lowered. The above-described temperature range may vary depending on the dispersant.

The examples of the mobile device will be described hereinafter in conjunction with the drawings.

Example 23

Figure 3:
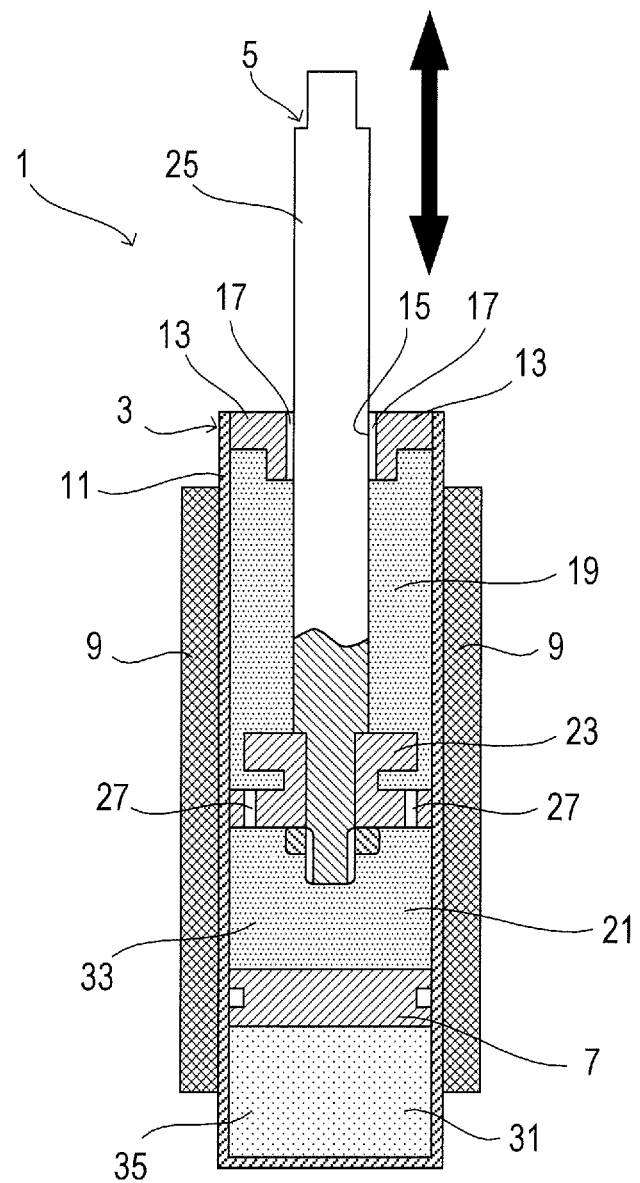
FIG. 3 is a diagram showing a damper using the dispersion material of the present invention.

As shown in FIG. 3, a damper 1 of the present example is formed of a housing 3, a mobile member 5, a free piston 7, a heater 9, a fluid 33 charged in the housing 3, a gas 35, and the like.

The housing 3 comprises a tubular cylinder 11 having a one end (upper end in FIG. 3) opened and the other end (lower end in FIG. 3) closed, and an upper end plate 13 mounted on the opening of the cylinder 11.

The upper end plate 13 is provided with a through-hole 15. On the inner wall of the through-hole 15 is fitted a sealing part 17 in a slidable contact with an outer periphery of a piston rod 25, as will be described hereinafter, in such a manner that the housing 3 is brought into a hermetically sealed state when sealed by the sealing part 17.

The mobile member 5 has a piston 23 which is slidably fitted into the housing 3 in an axial direction (direction as indicated by arrow in FIG. 3) of the housing 3 (cylinder 11) and partitions the housing 3 into a first fluid chamber 19 at an opening side and a second fluid chamber 21 at a rear side and the piston rod 25 connected to the piston 23 and projecting outside the housing 3 after penetrating through the through-hole 15 of the upper end plate 13. The piston 23 is provided with an orifice 27 in communication between the first fluid chamber 19 and the second fluid chamber 21.

The free piston 7 is slidably fitted into the housing 3 in an axial direction of the housing 3 and partitions the second fluid chamber 21 from a gas chamber 31 to be charged with the gas 35.

The heater 9 is provided along an outer surface of the housing 3. The heater 9 is operated by an ON/OFF control by a not-shown controller. When the heater 9 is turned ON, the fluid 33 charged inside the housing 3 is heated elevating the temperature of the fluid 33.

As the fluid 33 charged in an interior of the housing 3, i.e. in the first fluid chamber 19 and the second fluid chamber 21, the dispersion material produced in Example 22 can be used.

The damper 1 of the present example having the configuration as described above is constructed to operate the mobile member 5 in the axial direction of the cylinder 11 so as to absorb shock applied to the piston rod 25. When no external force is applied to the piston rod 25 due to a difference between gas pressures of the two chambers applied to the piston 23, the piston rod 25 moves to a position at which it projects from the housing 3.

In the damper 1 of the present example, a viscosity of the fluid 33 charged in the housing 3 is reversibly increased along with an increase in the temperature of the fluid 33 within a predetermined temperature range. Therefore, a buffering property of the damper 1 can be adjusted by increasing the viscosity of the fluid 33 increased by heating the fluid 33 by turning the heater 9 on or by reducing the viscosity of the fluid 33 by lowering the temperature of the fluid 33 by turning the heater 9 off.

Example 24

Figure 4:
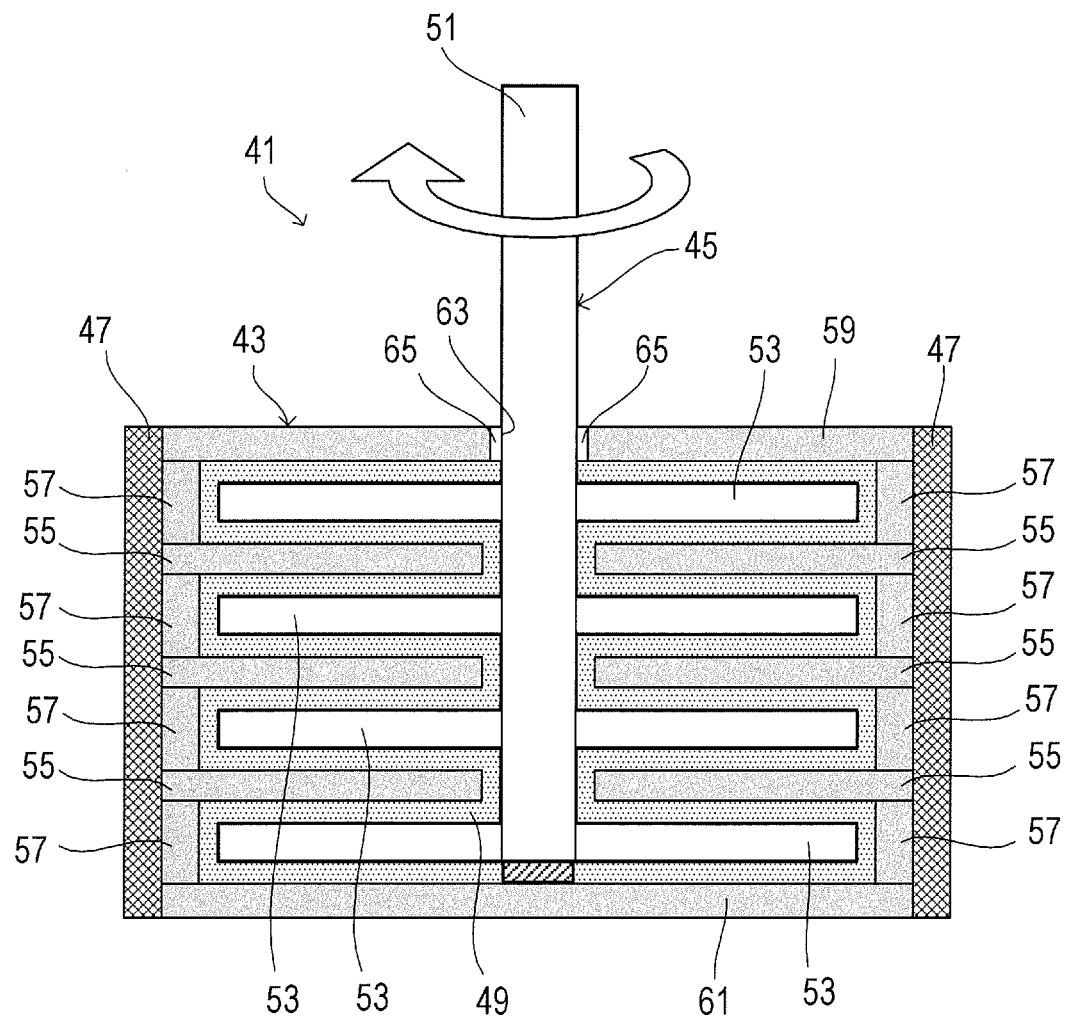
FIG. 4 is a diagram showing a rotary damper using the dispersion material of the present invention.

As shown in FIG. 4, a rotary damper 41 of the present example is formed of a housing 43, a mobile member 45, a heater 47, a fluid 49 charged in the housing 43, and the like.

The mobile member 45 has a shaft 51 which is rotatably inserted into the housing 43 and partially projects outside the housing 43 and a plurality of circular plate-like rotors 53 accommodated in the housing 43 and connected to one end of the shaft 51.

The housing 43 is provided with a plurality of circular plates 55 each with a through-hole formed at the center thereof, plural circular spacers 57 whose inner peripheries are disposed in an opposed relationship with the outer peripheries of the respective rotors 53 and which are alternately superimposed on the plates 55 and sandwiched vertically by the spacers 57 in a manner as shown in FIG. 4, an upper cover 59 superimposed on an upper side of the uppermost spacer 57 as shown in FIG. 4, and a lower cover 61 disposed at the bottom side of the lowermost spacer 57. The housing 43 has a hollow and substantially cylindrical shape as a whole. The through-holes of the plates 55 provided in the housing 43 are formed so as to have the diameter that allows insertion of the shaft 51.

The upper cover 59 is provided with a through-hole 63 through which the shaft 51 is inserted. On an inner wall of the through-hole 63 is fitted a sealing part 65 in slidable contact with an outer periphery of the shaft 51, and the housing 43 is hermetically sealed by the sealing part 65.

In the mobile member 45, the shaft 51 is inserted into the housing 43 and rotatably supported by the upper cover 59. The rotors 53 are disposed at a spaced relationship along an axial direction of the shaft 51, and an outer periphery of each of the rotors 53 is opposed to an inner periphery of the respective spacers 57. Each of the rotors 53 is inserted between the upper cover 59 and the plate 55, between the plates 55, and between the plate 55 and the lower cover 61 with a clearance. The fluid 49 is charged in the clearances.

The heater 47 is provided along an outer surface of the housing 43. The heater 47 is operated in an ON/OFF control by a not-shown controller. As the heater 47 is turned ON, the fluid 49 charged inside the housing 43 is heated to raise the temperature of the fluid 49.

As the fluid 49 charged in the interior of the housing 43, the dispersion material produced in Example 22 may be used.

In the rotary damper 41 of the present example having the configuration as described above, the rotors 53 rotate along with the rotation of the shaft 51. During the rotation, a rotation force applied to the shaft 51 is damped due to a viscous friction of the fluid 49 charged in the housing 43.

In the rotary damper 41 of the present example, the viscosity of the fluid 49 charged in the housing 43 is reversibly increased along with a rise of the temperature of the fluid 49 within a predetermined temperature range. Therefore, a rotation damping property of the rotary damper 41 can be adjusted by increasing the viscosity of the fluid 49 by heating the fluid 49 by turning the heater 47 ON and reducing the viscosity of the fluid 49 by lowering the temperature of the fluid 49 by turning the heater 47 OFF.

Example 25

Figure 5:
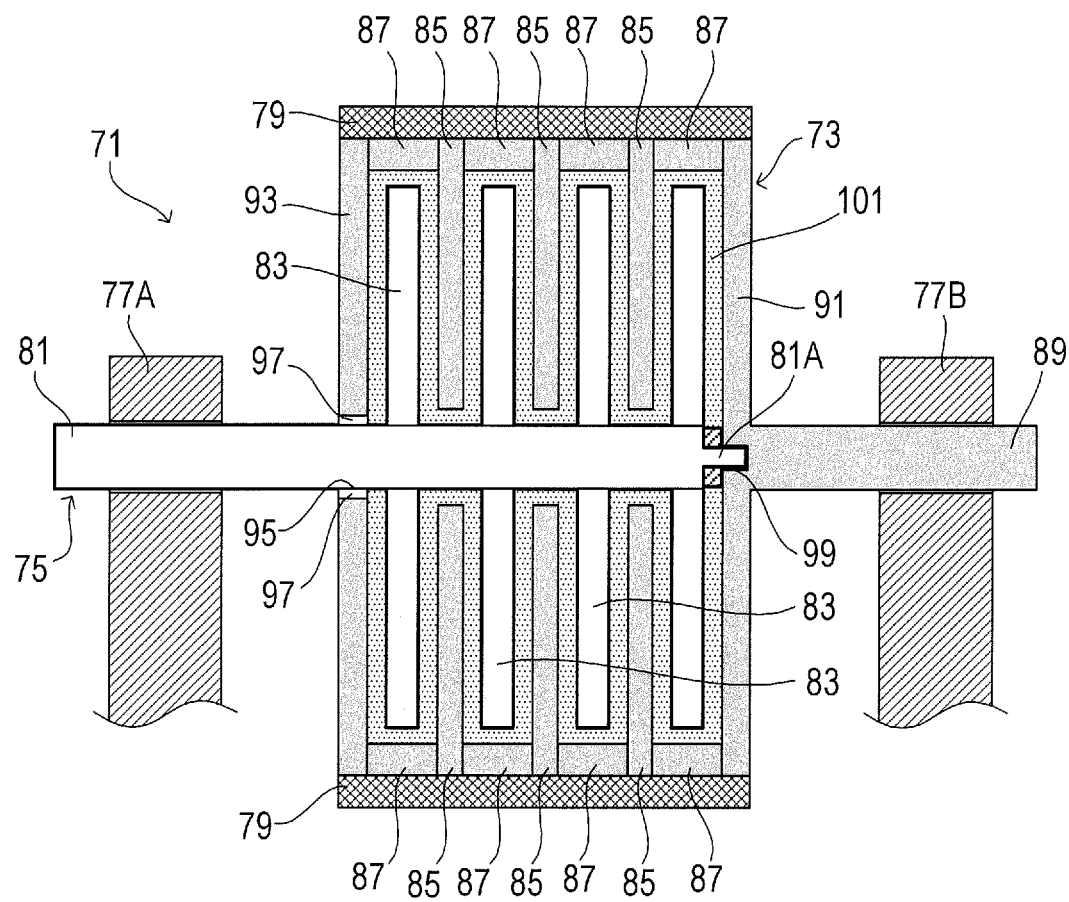
FIG. 5 is a diagram showing a clutch using the dispersion material of the present invention.

As shown in FIG. 5, a clutch 71 of the present example is formed of a housing 73, a mobile member 75, a pair of bearings 77A and 77B, a heater 79, a fluid 101 charged in the housing 73, and the like.

The mobile member 75 has a shaft 81 inserted rotatably into the housing 73 and partially projecting outside the housing 73 and a plurality of circular plate-like rotors 83 housed in the housing 73 and connected to one end of the shaft 81.

The housing 73 is provided with a plurality of circular plates 85 each having a through-hole at the center thereof, circular spacers 87 whose inner periphery is each disposed in an opposed relationship with the outer periphery of the respective rotors 83 and which are superimposed alternately on the plates 85 and sandwich the plates 85 horizontally as shown in FIG. 5, a first cover 91 disposed at the spacer 87 at one end (right end in FIG. 5) and provided with a journal 89, and a second cover 93 disposed at the spacer 87 at the other end. The housing 73 has a hollow and substantially cylindrical shape as a whole. The through-holes of the plates 85 provided in the housing 73 have the diameter that allows insertion of the shaft 81.

The second cover 93 is provided with a through-hole 95 through which the shaft 81 is inserted. On an inner wall of the through-hole 95 is fitted a sealing part 97 in a slidable contact with an outer periphery of the shaft 81 to bring the inside of the housing 73 in a hermetically sealed state.

In the mobile member 75, the shaft 81 is inserted into the housing 73 and rotatably supported by the second cover 93. The rotors 83 are disposed at a spaced relationship along an axial direction of the shaft 81, and an outer periphery of each of the rotors 83 is opposed to an inner periphery of the respective spacers 87. Each of the rotors 83 is inserted between the first cover 91 and the plate 85, between the plates 85, and between the plate 85 and the second cover 93 with a clearance. The fluid 101 is charged in the clearances.

A tip portion 81A of the shaft 81 inside the housing 73 is rotatably inserted into a groove 99 of the second cover 93. The bearings 77A and 77B support the shaft 81 and the journal 89 of the housing 73 in such a manner that the shaft 81 rotates coaxially with the journal 89.

The heater 79 is provided along an outer surface of the housing 73 and can be operated by an ON/OFF control by a not-shown controller. When the heater 79 is turned ON, the fluid 101 charged inside the housing 73 is heated to raise the temperature of the fluid 101.

As the fluid 101 to be charged in the interior of the housing 73, the dispersion material produced in Example 22 may be used.

In the clutch 71 of the present example having the above-described configuration, the housing 73 is rotated by a viscous friction of the fluid 101 when a rotation force is applied from a not-shown driving source to the shaft 81, thereby rotating the journal 89 and transmitting the rotation force of the driving source to a not-shown object to be driven.

In the clutch 71 of the present example, the viscosity of the fluid 101 charged in the housing 73 is reversibly increased along with a rise of the temperature of the fluid 101 within a predetermined temperature range. Therefore, a power transmission property (power loss) of the clutch 71 can be adjusted by controlling an amplitude of the viscous friction by increasing the viscosity of the fluid 101 by heating the fluid 101 by turning the heater 79 ON and reducing the viscosity of the fluid 101 by lowering the temperature of the fluid 101 by turning the heater 79 OFF.

In the present example, the housing 73 corresponds to the second rotary element of the present invention.

The housing 73 may be fixed so as to be not rotatable, and a rotary element different from the housing 73 may be provided inside the housing 73, so that an external output is performed when the rotary element is rotated by a viscous friction upon application of a rotation force to the shaft 81.

Variation Examples

Examples 23 to 25 of the mobile devices using the dispersion materials of the present invention are described above, however, the present invention is not limited to the above-described examples at all and encompasses various modes within its scope insofar as the modes belong to the technical scope of the present invention.

For example, the mobile device may be adapted to various devices without being limited to the damper and the clutch.

The mobile device may be formed without using the heater. In this case, for example, it is possible to increase the temperature of the fluid charged in the housing by utilizing heat from another heat source such as an engine. Further, as the mobile member of the mobile device can be operated, i.e., the fluid can be heated by an operation of the mobile member in the mobile device, i.e. by a friction between the mobile member and the fluid, it is possible to control the viscosity by changing the temperature of the fluid without using any heat source. Moreover, a cooling device for reducing the temperature of the fluid may be provided.

Though the configuration in which the dispersion material produced in Example 22 is used as the fluid to be used in the mobile device is exemplified, the dispersion material is not limited thereto, and various dispersion materials may be used insofar as the dispersion material is one of those of the present invention.

The mobile device may also be provided with a mechanism for detecting a change in viscosity caused by changes of the temperature of the dispersion material thereby enabling to perform a predetermined control as the viscosity is changed.

Figure 6:
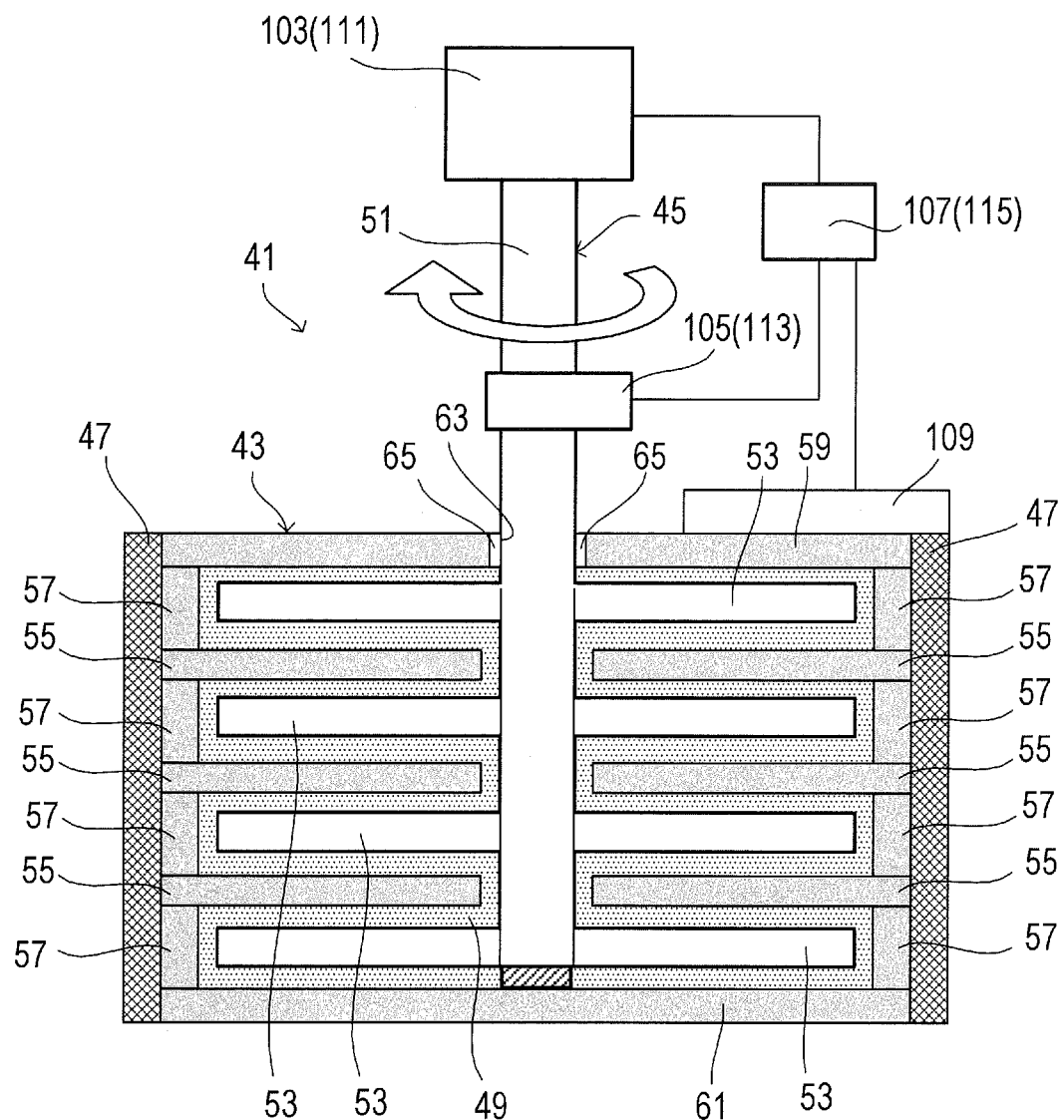
FIG. 6 is a diagram showing a variation example of a rotary damper using the dispersion material of the present invention.

More specifically, as shown in FIG. 6, it is contemplated that the rotary damper 41 of Example 24 is provided with a device 103 for applying a torque to the shaft 51 so as to rotate the shaft 51 at a predetermined rotational speed, a device 105 for measuring the torque applied to the shaft 51, and a device 107 for performing a predetermined output when the measured torque reaches a predetermined value. The device 105 sends information of the measured torque to the device 107.

As the viscosity of the fluid 49 charged in the housing 43 is changed, the torque required for rotating the shaft 51 at the predetermine speed is changed. In the above-described mobile device, the mobile device may be operated in an appropriate manner as the device 107 produces the predetermined output when the temperature of the fluid 49 charged in the housing is changed and consequently the viscosity is changed thereby changing the torque to be applied to the shaft 51. When the viscosity is increased as the temperature of the fluid 49 changes, a stable operation can be conducted, for example, by outputting a control signal to a cooler 109 in order to operate the cooler 109 to reduce the temperature of the fluid 49 or a control signal to the device 103 applying the torque to the shaft 51 in order to reduce the rotational speed of the shaft to control the temperature of the fluid 49 within a constant temperature range.

As another configuration which detects the change in viscosity, it is contemplated that, as shown in FIG. 6, the rotary damper 41 of Example 24 is provided with a device 111 for applying a predetermined torque to the shaft 51, a device 113 for measuring a rotational speed of the shaft 51, and a device 115 for producing a predetermined output when the measured rotational speed becomes a predetermined value. The device 113 sends information of the measured rotational speed to the device 115.

As the viscosity of the fluid 49 charged in the housing 43 is changed, the rotational speed of the shaft 51 for applying the predetermined torque is applied is changed. In the above-described mobile device, the mobile device may conduct an appropriate operation by producing a predetermined output to the device 115 when the rotational speed of the shaft 51 is changed as the viscosity is changed by changing the temperature of the fluid 49 charged in the housing 43. When the viscosity is increased by the increase in the temperature of the fluid 49, a stable operation may be conducted by controlling the temperature of the fluid 49 within a predetermined temperature range, for example, by outputting a control signal to a cooler 109 in order to operate the cooler 109 so as to reduce the temperature of the fluid 49, or a control signal to the device 111 for applying the torque to the shaft 51 in order to reduce the torque applied to the shaft.

Figure 7:
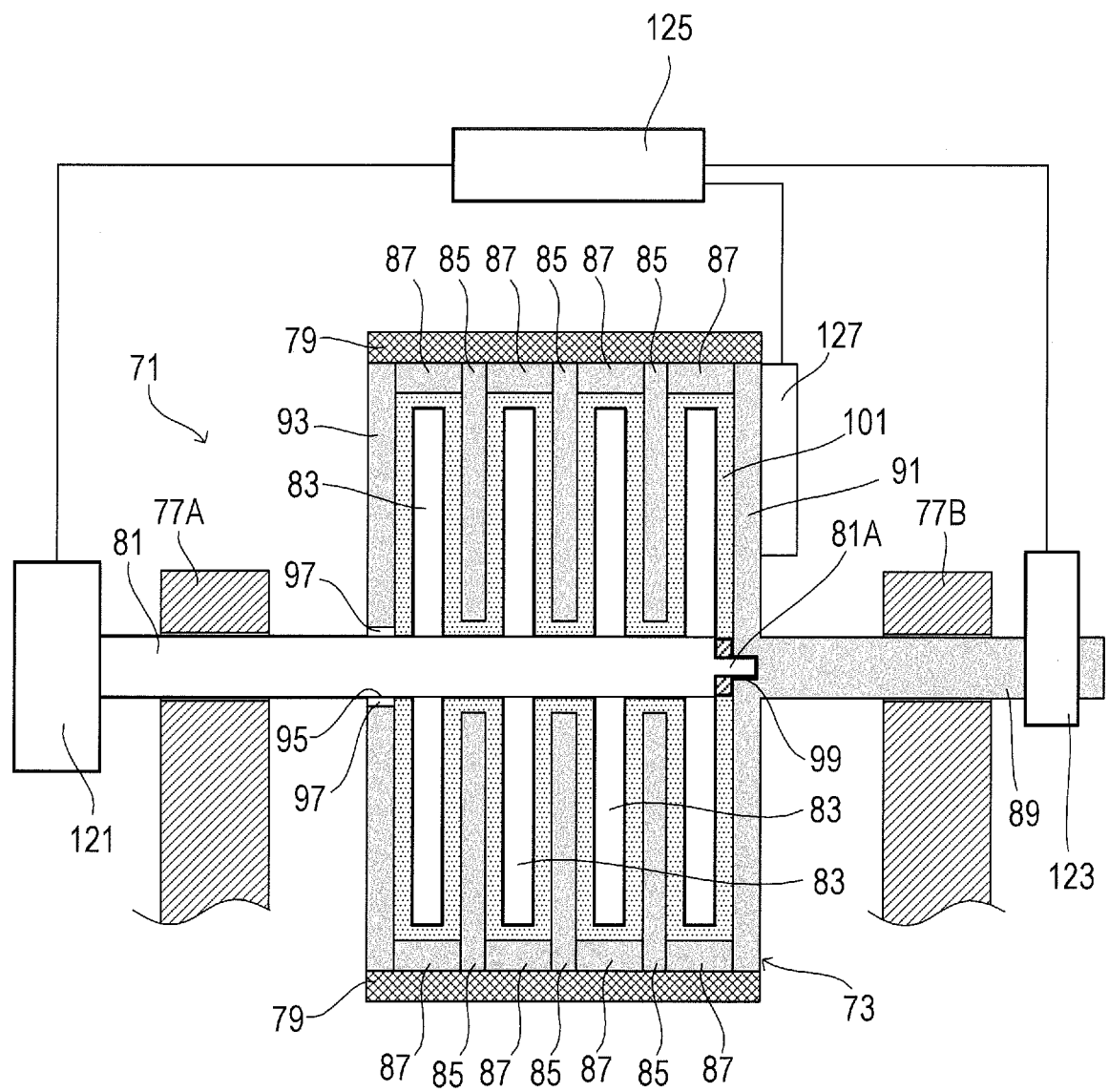
FIG. 7 is a diagram showing a variation example of a clutch using the dispersion material of the present invention.

Also, the clutch 71 of Example 25 may be configured such that a mechanism for detecting a change in viscosity in a manner as described above is disposed to perform a predetermined control when the viscosity is changed. More specifically, as shown in FIG. 7, it is contemplated to provide a device 121 for applying a torque to the shaft 81, a device 123 for measuring a rotational speed or a torque of the housing 73 (the second rotary element), and a device 125 for producing a predetermined output when the measured rotational speed or torque becomes a predetermined value. The device 121 for applying the torque to the shaft 81 may be the device that applies the torque so as to rotate the shaft 81 at a predetermined rotational speed or the device that applies a predetermined torque to the shaft 81. The device 123 sends information of the measured rotational speed or torque to the device 125.

When the viscosity of the fluid 101 charged in the housing 73 is changed, the rotational speed or the torque of the housing 73 rotating along with the rotation of the shaft 81, i.e. with the rotation of the rotor 83 is changed.

For the above-described mobile device, the mobile device can be operated in an appropriate fashion by outputting a predetermined output to the device 125 when the viscosity is changed by the change in temperature of the fluid 101 charged in the housing 73 and consequently the rotational speed or torque of the housing 73 is changed by the change in viscosity. When the viscosity is increased by the increase in temperature of the fluid 101, a stable operation can be conducted by controlling the temperature of the fluid 101 in a constant temperature range, for example, by outputting a control signal to a cooler 127 to operate the cooler 127 to reduce the temperature of the fluid 101 or a control signal to the device 121 applying the torque to the shaft 81 to apply the torque to the shaft 81 to reduce the rotational speed.

Separator Treated with Surface Treatment Agent of Present Invention

The surface treatment agent according to the present invention is used for surface-treating a separator containing a crystalline polymer as a main component and as an additive for an electrolytic solution of a rechargeable lithium ion battery using the separator containing a crystalline polymer as a main component.

The surface treatment agent of the present invention is a copolymer of a first monomer and a second monomer as will be described hereinafter in this description. The surface treatment agent converts a surface state of the separator into a state of affinity for an electrolytic solution by an interaction of adhesion between the crystalline polymer and a portion of the copolymer corresponding to the monomer (first monomer) having a high affinity for the crystalline polymer up to a certain predetermined temperature. Therefore, wettability is remarkably improved, and satisfactory charging and moistening of the electrolytic solution are attained, resulting in a reduction of electric resistance between positive and negative electrodes.

On the other hand, the separator treated with the surface treatment agent or the rechargeable lithium ion battery using the electrolytic solution containing the surface treatment agent may cause an increase in electric resistance at a temperature higher than the certain predetermined temperature.

By taking advantages of these phenomena, it is possible to provide the rechargeable lithium ion battery with a self-temperature control function by which to sense a rise in the temperature of the rechargeable lithium ion battery from the electric resistance between the electrodes, or to increase the electric resistance spontaneously as the temperature is elevated or to reduce the electric resistance as the temperature is lowered.

The separator treated with the surface treatment agent of the present invention will hereinafter be referred to simply as a separator of the present invention.

Figure 8:
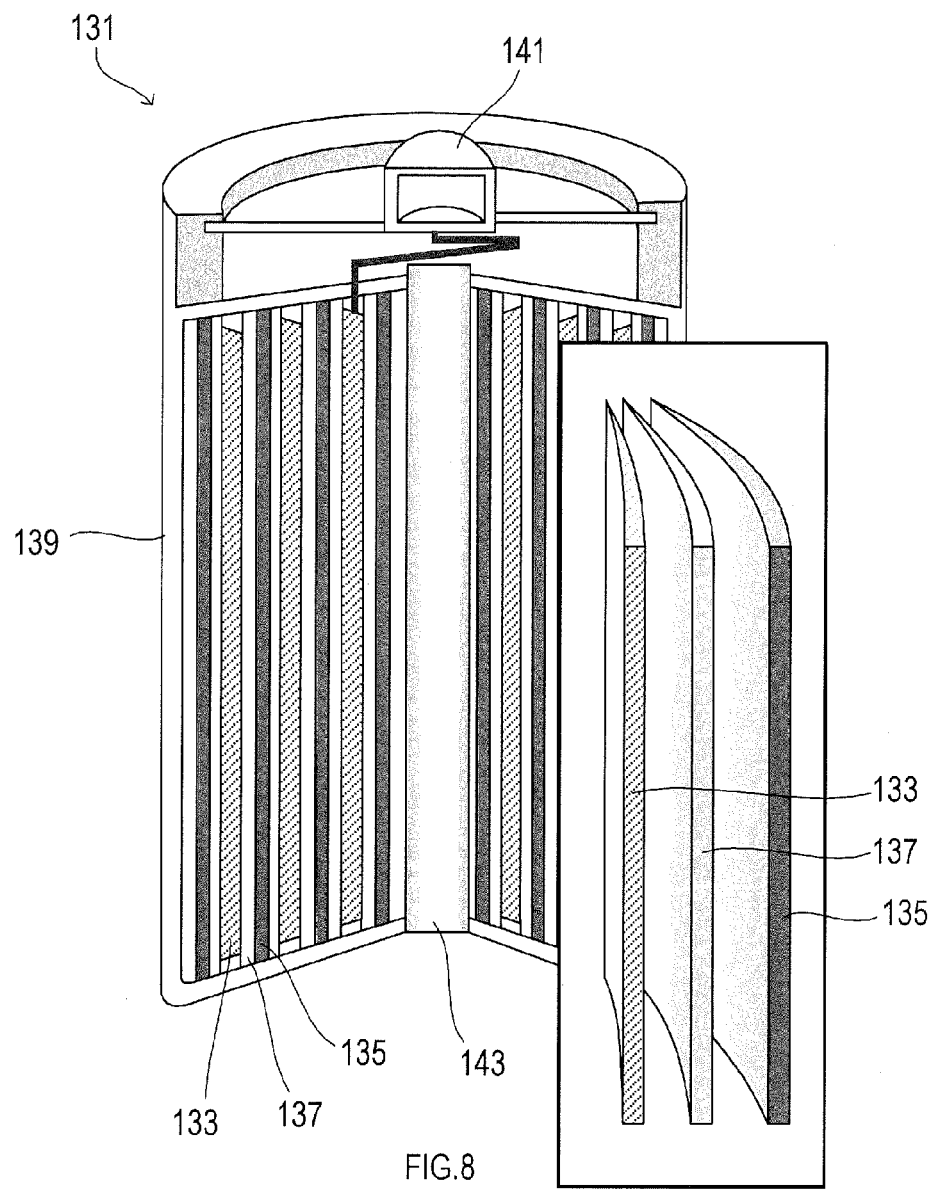
FIG. 8 is a diagram showing a rechargeable lithium ion battery in which a separator of the present invention is used.

FIG. 8 shows an example of the configuration of the rechargeable lithium ion battery in which the separator of the present invention is used.

A rechargeable lithium ion battery 131 may assume a state in which a strip-shaped positive electrode 133 and a strip-shaped negative electrode 135 are wound in close contact with each other via a separator 137. The battery elements are housed inside a cylindrical housing 139, and a positive electrode terminal 141 connected to the positive electrode 133 and a negative electrode terminal 143 connected to the negative electrode 135 project outside the housing 139. The configuration of the rechargeable lithium ion battery is not limited to the one illustrated in FIG. 8 and may be used for batteries of various configurations. For example, the battery may have a flat housing.

As an electrolytic solution, there may be used a nonaqueous solvent or a lithium salt dissolved into the nonaqueous solvent. As the nonaqueous solvent, there may be mentioned a cyclic carbonate ester such as ethylene carbonate and propylene carbonate, a chained carbonic acid ester such as dimethyl carbonate, diethyl carbonate, and ethyl methyl carbonate, a cyclic carboxylic acid ester such as γ-butyrolactone and γ-valerolactone, or the like.

As the lithium salt, there may be used $LiPF_6$, $LiBF_4$, and the like, and they may be used alone or in combination.

The separator of the present invention may contain a crystalline polymer as a main component which may include, for example, a polyethylene-based or nylon-based crystalline polymer. As a matter of course, there may also be used a composite-type separator obtained in combination of polyethylene with polypropylene.

The separator of the present invention may be surface-treated with a surface treatment agent as will be described hereinafter in this description. The separator may be treated with the surface treatment agent before contact with the electrolytic solution or at the stage of contact with the electrolytic solution by adding the surface treatment agent to the electrolytic solution.

The surface treatment agent of the present invention comprises the copolymer of at least two kinds of monomers, namely, the first monomer and the second monomer. The first monomer is a crystalline monomer and adheres to a surface of the separator comprising as a main component a crystalline polymer having a molecular structure identical to the polymer in which a polymer portion comprising the first monomer is crystallized. Since the second monomer has affinity for a solvent, the separator surface is altered to be solvent-philic, thereby realizing a modification of the separator surface. More specifically, the first monomer is a crystallizable monomer as a polymer having a molecular structure identical to that of the crystalline polymer as the main component of the separator.

As the first monomer, those described below may be used. The substances described below may be used alone or plurality of kinds thereof may be used in combination:

(A) ethylene;

(B) any one of (meth)acrylate, (meth)acrylamide, vinyl ether, vinyl ester, siloxane, α-olefin, and substituted styrene, each having a straight-chained alkyl group having at least 8 carbon atoms at a side chain;

(C) any one of (meth)acrylate, (meth)acrylamide, vinyl ether, vinyl ester, siloxane, α-olefin, and substituted styrene each having a straight-chained alkyl group having at least 8 carbon atoms at a side chain and being at least partially substituted with fluorine; and (D) polypropylene.

The separator for which the above described surface treatment agent exerts a favorable modification function is the separator comprising the crystalline polymer having the molecular structure identical to that of the first monomer as the main component.

As the second monomer, those described below may be used. The substances as described below may be used alone or in combination with plural kinds:

(E) Any one of (meth)acrylate, vinyl ether, vinyl ester, maleic acid ester, itaconic acid ester, acrylamide, and substituted styrene, each having a straight-chained alkyl group having 7 carbon atoms or less;

(F) any one of (meth)acrylate, vinyl ether, vinyl ester, maleic acid ester, itaconic acid ester, and acrylamide, each having a branched alkyl group;

(G) any one of (meth)acrylate, vinyl ether, vinyl ester, maleic acid ester, itaconic acid ester, acrylamide, and substituted styrene, each having an aryl group;

(H) any one of (meth)acrylate, vinyl ether, vinyl ester, maleic acid ester, itaconic acid ester, acrylamide, and substituted styrene, each having an oxyethylene structure or an oxypropylene structure;

(I) styrene;

(J) acrylic acid;

(K) methacrylic acid;

(L) vinyl acetate;

(M) (meth)acrylate having dimethyl siloxane at a side chain; and (N) (meth)acrylate having fluorinated alkyl at a side chain.

The second monomer is not limited to those as described above insofar as it is capable of forming the copolymer with the first monomer. The monomer having a high affinity for the nonaqueous solvent forming the electrolytic solution of the rechargeable lithium ion battery may also be used as the second monomer.

In the case of using the surface treatment agent for the separator comprising a polyethylene-based or nylon-based crystalline polymer as a main component, the first monomer may be (meth)acrylate having a straight-chained alkyl group having at least 8 carbon atoms at a side chain or ethylene, and the second monomer may be any one of (meth)acrylates, each having a straight-chained alkyl group having 7 carbon atoms or less, a branched alkyl group, an aryl group, or an oxyethylene structure, or vinyl acetate.

Further, the first monomer may be a (meth)acrylate having a straight-chained alkyl group having at least 12 carbon atoms at a side chain.

In the case of using the surface treatment agent for the separator comprising a polyfluoroethylene-based crystalline polymer as a main component, the first monomer may be a (meth)acrylate having a straight-chained alkyl group having at least 8 carbon atoms at a side chain and being at least partially substituted with fluorine, or ethylene, and the second monomer may be any one of (meth)acrylates, each having a straight-chained alkyl group having 7 carbon atoms or less, a branched alkyl group, an aryl group, or an oxyethylene structure.

Figure 9:
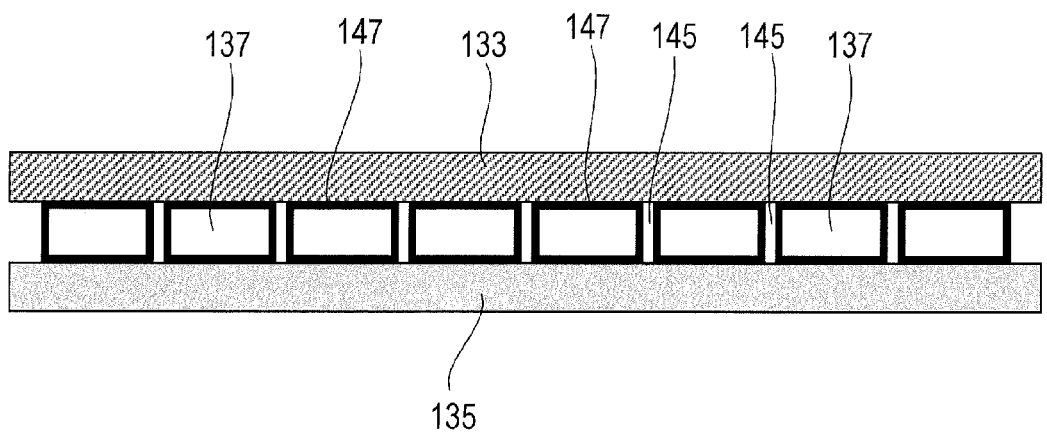
FIG. 9 is a conceptual diagram showing a cross-sectional surfaces of lateral surfaces of the separator, positive electrode, and negative electrode.

FIG. 9 is a conceptual sectional side view showing the separator 137 which is surface-treated with the above-described surface treatment agent, the positive electrode 133, and the negative electrode 135. As the separator 137 is a porous material, a great number of micro-sized flow paths 145 are present in communication between the positive electrode 133 and the negative electrode 135. The entire surface of the separator 137 including the surfaces of the flow paths 145 is surface-treated with the surface treatment agent 147. The surface treatment agent 147 has a high affinity for the separator 137 of polyethylene or the like derived from the first monomer and for a solvent such as ethylene carbonate, propylene carbonate, and dimethyl carbonate forming an electrolytic solution, derived from the second monomer, which is present between the positive electrode 133 and the negative electrode 135. Therefore, the electrolytic solution in the separator 137 is provided with an improved wettability and a property that the electrolytic solution readily permeates through the flow paths 145.

Productions of Separator and Rechargeable Lithium Ion Battery

Example 26

The block copolymer (dispersant) produced in Example 1 was used as a surface treatment agent to surface-treat a separator made from polyethylene. The surface treatment agent of the present example has the same constitution as the dispersant of Example 1, it was used by a different procedure. A rechargeable lithium ion battery shown in FIG. 8 was produced by using the surface-treated separator.

The surface treatment of the separator was conducted by the procedure described below. The surface treatment agent was dissolved into a 1% by weight butyl acetate solution, and the separator made from polyethylene was immersed in the resulting solution for 24 hours. After that the separator was subjected to air drying and thereafter vacuum drying.

For each structuring element of the rechargeable lithium ion battery, raw materials for ordinary rechargeable lithium ion batteries may be used, and it may be manufactured by conventional production processes. As the separator has a favorable property of permeating the electrolytic solution, the procedure for operating the separator can be made more simplified, for example, by removing an operation for permeating the electrolytic solution.

The dispersants produced in Examples 1 to 21 can be used as surface treatment agents for treating separators. These surface treatment agents may also be used in appropriate combination thereof by using a material having an affinity for the first monomer as the separator, which is one of the structuring elements of each of the surface treatment agents, and a material having an affinity for the second monomer as the electrolytic solution.

Evaluation of Surface Modification of Separator

An evaluation test was conducted by using a three-layer porous film (UPORE UP3074 manufactured by Ube Industries, Ltd.) formed of polypropylene, polyethylene, and polypropylene layers and having a film thickness of 20 μm as a substitute for the separator.

As the block copolymer to be used as the surface treatment agent, the one prepared in Example 1 (stearyl acrylate-b-butyl acrylate (StA/BA=3,000/5,000), i.e., a block polymer in which StA block has a molecular weight of 3,000 and BA block has a molecular weight of 5,000) was used.

The surface treatment of the separator was performed by the procedure as will be described below. The block polymer was dissolved into a butyl acetate solution to yield two kinds of dilute solutions containing the block copolymer in the amount of 2% by weight or 5% by weight, respectively. The separator was cut into pieces each having the size of 1 cm×1 cm and then immersed in the diluted solutions for predetermined time periods, followed by vacuum drying. The test pieces were prepared by immersing the separator pieces, respectively, in the two kinds of the diluted solutions for 3 hours, 6 hours, and 24 hours.

A test solution was prepared by mixing ethylene carbonate (EC), propylene carbonate (PC), and dimethyl carbonate (DMC) at a weight ratio of EC:PC:DMC=1:1:1, respectively. The permeability of the test solution to the test pieces was confirmed by dripping the test solution onto the test pieces that were surface-treated in the manner as described above and the test pieces that was not surface-treated. The results of permeability are shown in Table 10.

TABLE 10

|  | Untreated | 3 hr. Immersion | 6 hr. Immersion | 24 hr. Immersion |
|---|---|---|---|---|
| 2 wt % Solution | X | ○ | ○ | ○ |
| 5 wt % Solution |  | ○ | ○ | ○ |

In Table 10 above, the test pieces to which the test solution permeated are indicated by sign "○", and the test pieces to which no test solution permeated are indicated by sign "x". Table 10 reveals that the test solution was found favorably permeable to the test pieces surface-treated. In other words, it was found that the affinity between the separator and the electrolytic solution is improved. On the other hand, the test solution was not permeable to the untreated and non-surface treated test pieces.

Impedance Measurement

A change in impedance caused by a temperature between the positive electrode and the negative electrode interposing the separator of the present invention therebetween was measured.

In the test, a polyethylene porous filter (Mykrolis UPE CWAT04700, pore size: 10 nm) was used as the separator.

As the surface treatment agents, there were used two kinds of surface treatment agents, namely, (i) the one prepared in Example 1 (stearyl acrylate-b-butyl acrylate (StA/BA=3000/5000); block polymer in which StA block has a molecular weight of 3,000 and BA block has a molecular weight of 5,000) and (ii) stearyl acrylate-b-butyl acrylate (StA/BA=3000/3000) which is a block polymer in which StA block has a molecular weight of 3,000 and BA block has a molecular weight of 3,000). The copolymer (ii) may be prepared in a manner as will be described in Example 27 below.

Example 27

A reaction vessel was charged with SG-1-MA (0.762 g, 2.0 mmol), stearyl acrylate (10.0 g, 30 mmol), and n-butyl acetate (12.5 g), followed by $N_2$ bubbling for 20 minutes and conducting the reaction of the reaction liquid at 118° C. while continuing the $N_2$ bubbling. After the reaction for 4 hours, normal butyl acrylate (10.0 g, 78 mmol) $N_2$-bubbled for 20 minutes was added to the reaction vessel, and the reaction was again continued at 118° C. The reaction was terminated 5 hours after the addition of normal butyl acrylate to obtain a block copolymer. A weight average molecular weight of the block copolymer was Mw=5,910. The block copolymer was used as the copolymer (ii).

The surface treatment of the separator was conducted by the procedure as will be described below. Each of the block polymers as the surface treatment agents (i) and (ii) was dissolved into a butyl acetate solution to prepare solutions in each of which 1% by weight of the block polymer was contained. The above-described separators were respectively immersed in the solutions for 24 hours, followed by vacuum drying.

The electrolytic solution used for the test was prepared by mixing EC, PC and DMC at a ratio of EC:PC:DMC (1:1:1) in such a manner that 1 mol/L of $LiPF_6$ was dissolved relative to the entire amount of the mixture.

By sandwiching the separator between stainless electrodes impedance was measured under an inert gas atmosphere with an impedance measurement device, HIROKI3522-50, LCR-HITERSTER. A procedure of measurement will be described below.

AC impedance was measured at each of 34 points by changing frequency from 50 to 80,000 Hz. An absolute value |Z| and a transfer core θ were measured at each point, each of the values was divided into a real number and an imaginary number, and a Cole-Cole plot is pursued, thereby detecting bulk resistance at an intersection with the horizontal axis. Conductivity was calculated by dividing the thickness of the sample by the bulk resistance and the sectional area. The above-described operations were repeated by changing the temperature from 35° C. to 75° C. Similarly, the above-described operations were repeated by changing the temperature from 75° C. to 35° C.

A graph showing the measurement results is given in FIG. 10. FIG. 10 indicates a relative evaluation of the dependence of the impedance values on the temperature in the case of using the surface treatment agent of the present invention and the case of using nothing of the surface treatment agent after the standardization of the values at 35° C. The sample surface-treated with the surface treatment agent (i) is represented as "block 1" in the graph, and the sample surface-treated with the surface treatment agent (ii) is represented as "block 2" in the graph. The sample which was not surface-treated is represented as "untreated".

As is apparent from FIG. 10, the impedance is shown to be substantially constant irrespective of the temperature in the case where the surface treatment agent of the present invention is not used. On the other hand, in the case where the surface treatment agent of the present invention is used, the impedance is improved as the temperature is elevated, and the electric resistance is reduced. However, a sharp displacement appears at 55° C. and the electric resistance increases by 5% or more. The phenomenon is reproduced reversibly.

Therefore, in the rechargeable lithium ion battery using the separator, it is possible to suppress the thermal runaway due to the increase in electric resistance when the battery is heated to a high temperature.

When the thermal runaway occurs, the conventional polyethylene-based separator has the shutdown effect to suppress the thermal runaway by causing the polyethylene to melt to shut down the pores through which lithium ions migrate. It has entailed the problems, however, that short-circuiting is caused by a volumetric shrinkage due to re-cooling after the melting and that the battery per se becomes no longer reusable.

However, the separator treated with the surface treatment agent of the present invention can protect the battery itself by stopping the battery before the separator is molten or reducing an output owing to the increase in electric resistance.

The temperature range of a sharp transfer of the impedance is not limited to the above-described range of near 55° C. and can be adjusted appropriately by an amount of addition and type of the surface treatment agent.

The electric resistance increases as the battery is heated to a high temperature, so that it is possible to judge the increase in temperature based on the value of the electric resistance. In other words, the increase in the temperature can be detected without separately mounting a temperature sensor, thereby allowing a prevention of excessive heating of the battery by using an external cooling device or the like.

As the electric resistance reversibly changes with the change in temperature, the electric resistance can be reduced again by lowering the temperature even if the electric resistance would be increased, thereby permitting a repetitive use of the battery for a long time.

The invention claimed is:

1. A method for adjusting the viscosity of a dispersion material containing fine particles of a crystalline polymer as a dispersed particle with a dispersant by changing a temperature of the dispersion material, comprising increasing the viscosity of the dispersion material by elevating the temperature of the dispersion material or decreasing the viscosity of the dispersion material by lowering the temperature of the dispersion material, wherein the dispersant comprises a copolymer of a first monomer with a second monomer, in which:
   the first monomer is a monomer crystallizable as a polymer having a high affinity to the dispersed particle,
   the first monomer is one or more than one selected from:
   (A) ethylene;
   (B) a (meth)acrylate, a (meth)acrylamide, a vinylether, a vinylester, a siloxane, an α-olefin or a substituted styrene, each having a straight-chained alkyl side chain having at least eight carbon atoms;
   (C) a (meth)acrylate, a (meth)acrylamide, a vinylether, a vinylester, a siloxane, an α-olefin or a substituted styrene, each having an at least partially fluorinated straight-chained alkyl side chain having at least eight carbon atoms; and
   (D) propylene, and
   the second monomer is one or more than one selected from:
   (E) a (meth)acrylate, a vinylether, a vinylester, a maleic ester, an itaconic ester, an acrylamide, or a substituted styrene, each having a straight-chained alkyl side chain having seven carbon atoms or less than seven carbon atoms;
   (F) a (meth)acrylate, a vinylether, a vinylester, a maleic ester, an itaconic ester, an acrylamide, or a substituted styrene, each having a branched alkyl side chain having seven carbon atoms or less than seven carbon atoms;
   (G) a (meth)acrylate, a vinylether, a vinylester, a maleic ester, an itaconic ester, or an acrylamide, each having an aryl group;
   (H) a (meth)acrylate, a vinylether, a vinylester, a maleic ester, an itaconic ester, an acrylamide, or a substituted styrene, each having an oxyethylene structure or an oxypropylene structure;
   (I) styrene;
   (J) acrylic acid;
   (K) methacrylic acid;
   (L) vinyl acetate;
   (M) a (meth)acrylate having a dimethylsiloxane side chain, and
   (N) a (meth)acrylate having a fluorinated alkyl side chain.

2. The method for adjusting the viscosity of a dispersion material as claimed in claim 1, wherein the first monomer is a (meth)acrylate having a partially fluorinated, straight-chained alkyl side chain with at least 8 carbon atoms or ethylene; and the second monomer is a (meth)acrylate having a straight-chained alkyl side chain or a branched alkyl side chain, each with 7 carbon atoms or less than 7 carbon atoms, or having an aryl group or an oxyethylene structure.

3. The method for adjusting the viscosity of a dispersion material as claimed in claim 1, wherein the first monomer is a (meth)acrylate having a straight-chained alkyl side chain with at least 12 carbon atoms, or vinyl acetate.

4. The method for adjusting the viscosity of a dispersion material as claimed in claim 1, wherein the dispersed particle comprises a crystalline polymer of polyethylene-type or nylon-type.

5. The method for adjusting the viscosity of a dispersion material as claimed in claim 1, wherein the dispersed particle comprises a crystalline polymer of polyfluoroethylene type.

6. The method for adjusting the viscosity of a dispersion material as claimed in claim 1, wherein the copolymer is a block copolymer.

7. The method for adjusting the viscosity of a dispersion material as claimed in claim 1, wherein the dispersion material comprises the dispersant and a dispersion medium.

8. A method of using a copolymer as a dispersant for a dispersion material containing fine particles of a crystalline polymer by changing a viscosity of the dispersion material by changing a temperature of the dispersion material, comprising increasing the viscosity of the dispersion material by elevating the temperature of the dispersion material or decreasing the viscosity of the dispersion material by lowering the temperature of the dispersion material, wherein:
   the copolymer comprises a first monomer with a second monomer, in which:
   the first monomer is a monomer crystallizable as a polymer having a high affinity to the dispersed particle,
   the first monomer is one or more than one selected from:
   (A) ethylene;
   (B) a (meth)acrylate, a (meth)acrylamide, a vinylether, a vinylester, a siloxane, an α-olefin or a substituted styrene, each having a straight-chained alkyl side chain having at least eight carbon atoms;
   (C) a (meth)acrylate, a (meth)acrylamide, a vinylether, a vinylester, a siloxane, an α-olefin or a substituted styrene, each having an at least partially fluorinated straight-chained alkyl side chain having at least eight carbon atoms; and
   (D) propylene, and
   the second monomer is one or more than one selected from:
   (E) a (meth)acrylate, a vinylether, a vinylester, a maleic ester, an itaconic ester, an acrylamide, or a substituted styrene, each having a straight-chained alkyl side chain having seven carbon atoms or less than seven carbon atoms;
   (F) a (meth)acrylate, a vinylether, a vinylester, a maleic ester, an itaconic ester, an acrylamide, or a substituted styrene, each having a branched alkyl side chain having seven carbon atoms or less than seven carbon atoms;
   (G) a (meth)acrylate, a vinylether, a vinylester, a maleic ester, an itaconic ester, or an acrylamide, each having an aryl group;
   (H) a (meth)acrylate, a vinylether, a vinylester, a maleic ester, an itaconic ester, an acrylamide, or a substituted styrene, each having an oxyethylene structure or an oxypropylene structure;
   (I) styrene;
   (J) acrylic acid;
   (K) methacrylic acid;
   (L) vinyl acetate;
   (M) a (meth)acrylate having a dimethylsiloxane side chain, and
   (N) a (meth)acrylate having a fluorinated alkyl side chain.

9. The method as claimed in claim 8, further comprising forming, with the dispersion material, an industrial oil of a mobile device, or an electrolytic solution for a separator of a lithium ion battery, wherein the viscosity of the dispersion material is changed by changing the temperature of the dispersion material.

10. The method as claimed in claim 9, wherein the separator of the lithium ion battery is surface-treated with the copolymer and is used to increase an output of the lithium ion battery by decreasing a temperature of the lithium ion battery or to decrease an output of the lithium ion battery by increasing the temperature thereof.

11. The method as claimed in claim 8, wherein the first monomer is a (meth)acrylate having a partially fluorinated, straight-chained alkyl side chain with at least 8 carbon atoms or ethylene; and the second monomer is a (meth)acrylate having a straight-chained alkyl side chain or a branched alkyl side chain, each with 7 carbon atoms or less than 7 carbon atoms, or having an aryl group or an oxyethylene structure, or vinyl acetate.

12. The method as claimed in claim 8, wherein the first monomer is a (meth)acrylate having a straight-chained alkyl side chain with at least 12 carbon atoms.

13. The method as claimed in claim 8, wherein the crystalline polymer is a crystalline polymer of a polyethylene type or nylon type.

14. The method as claimed in claim 8, wherein the viscosity of the dispersion material is increased by raising a temperature of the dispersion material or the viscosity of the dispersion material is decreased by lowering a temperature of the dispersion material.

* * * * *